Aug. 4, 1936.　　　　H. F. SMITH　　　　2,049,782
REFRIGERATING APPARATUS
Original Filed Sept. 13, 1929　　19 Sheets-Sheet 1

Harry F. Smith
INVENTOR

BY Spencer Hardman
& Fehr ATTORNEYS

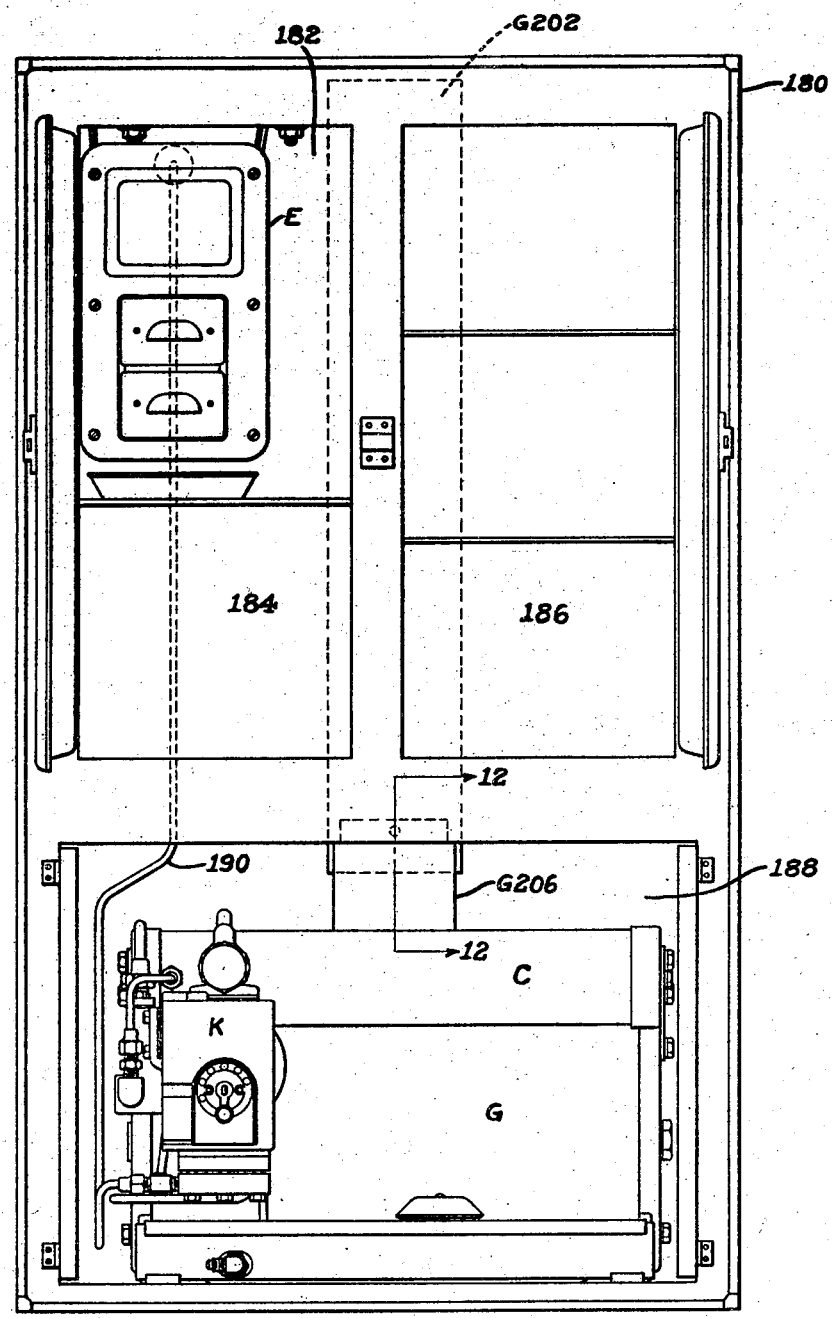

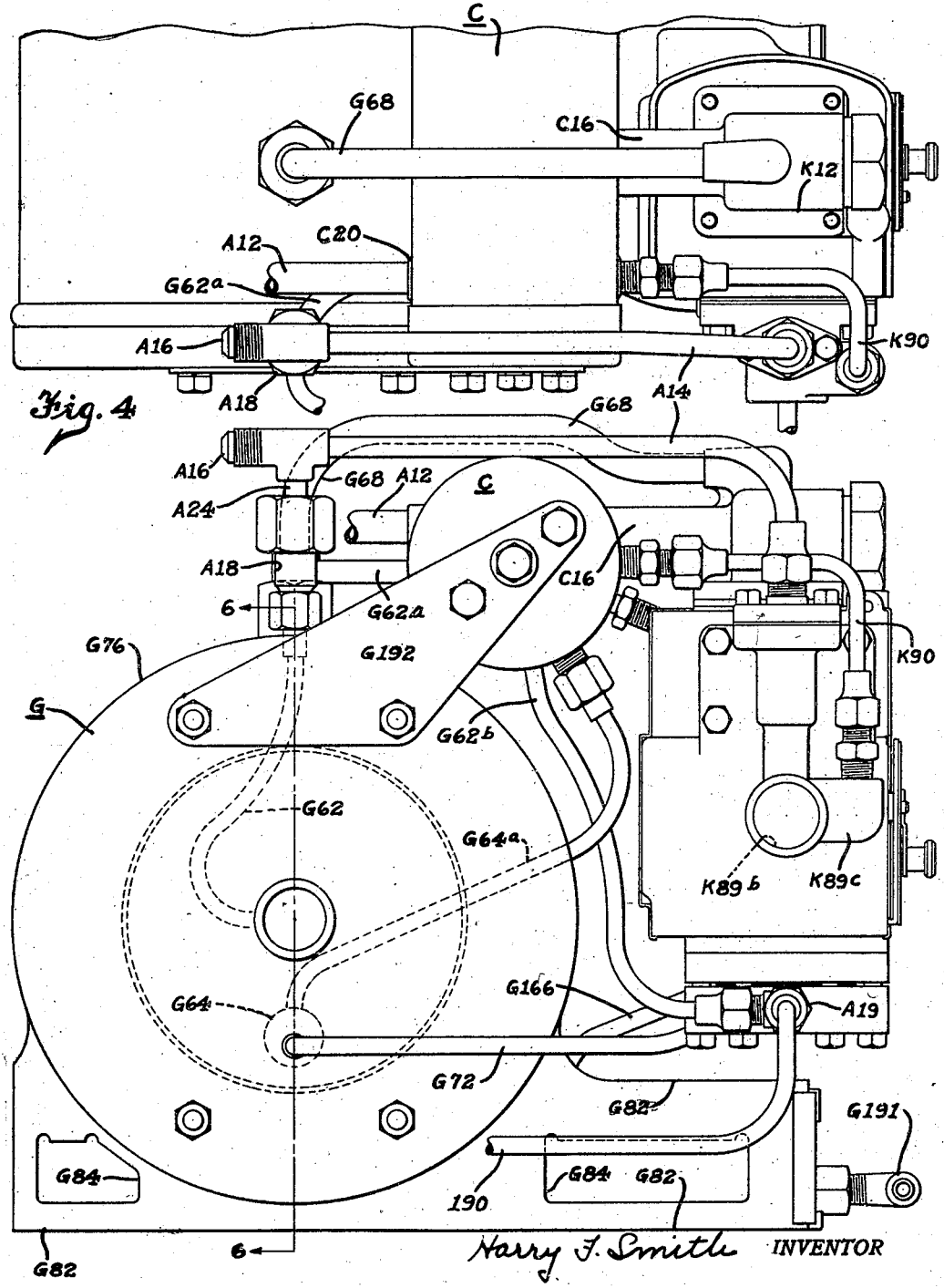

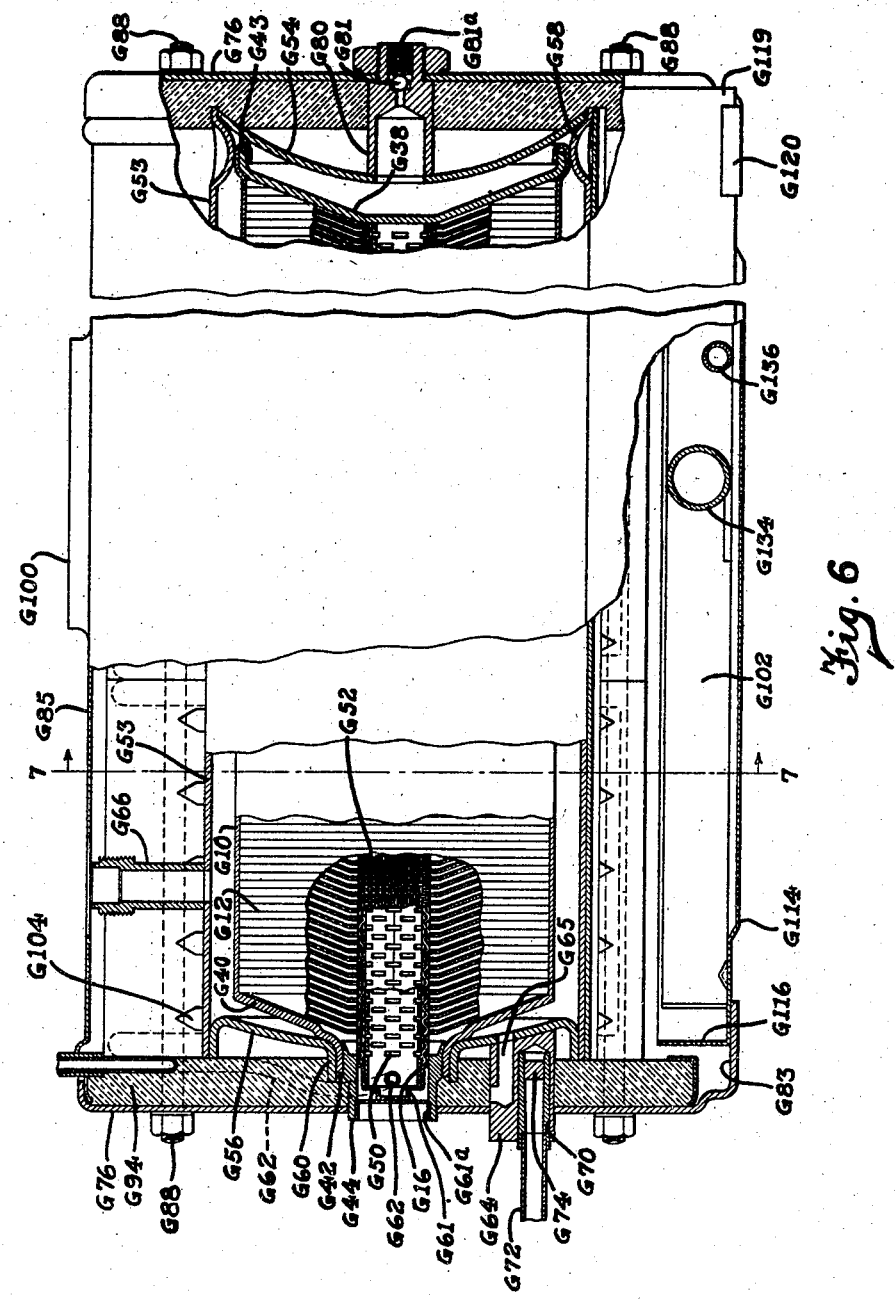

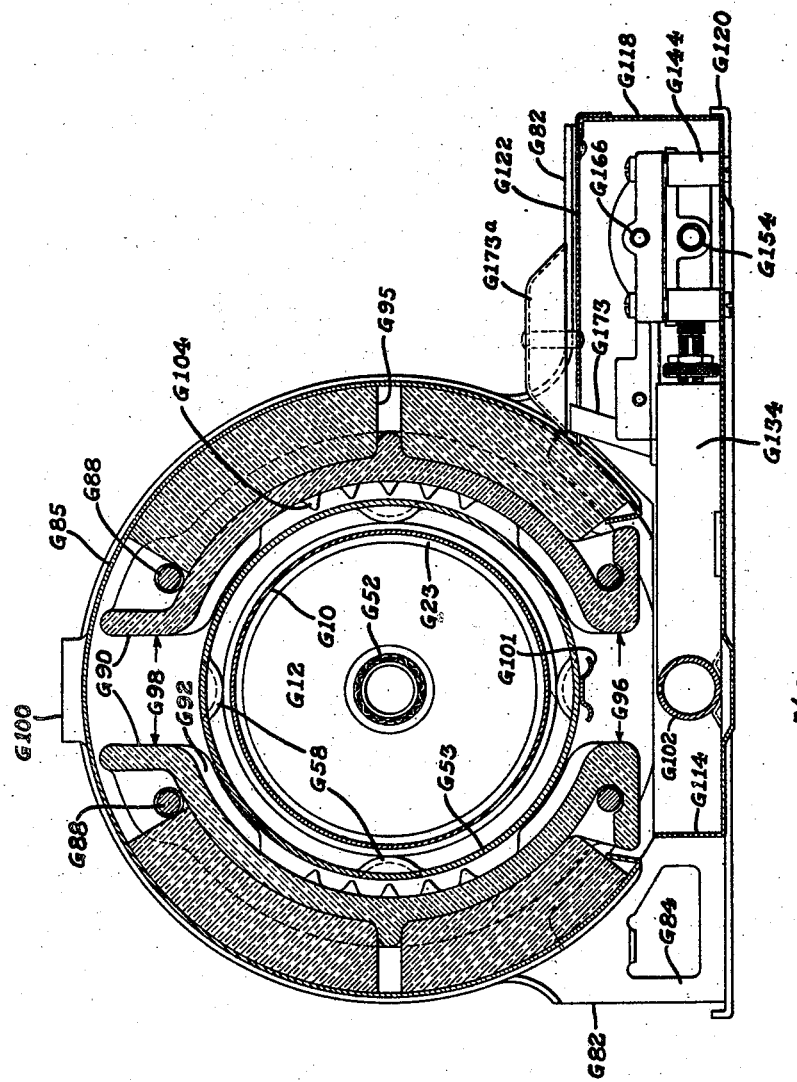

Aug. 4, 1936.　　　　H. F. SMITH　　　　2,049,782
REFRIGERATING APPARATUS
Original Filed Sept. 13, 1929　　19 Sheets-Sheet 6
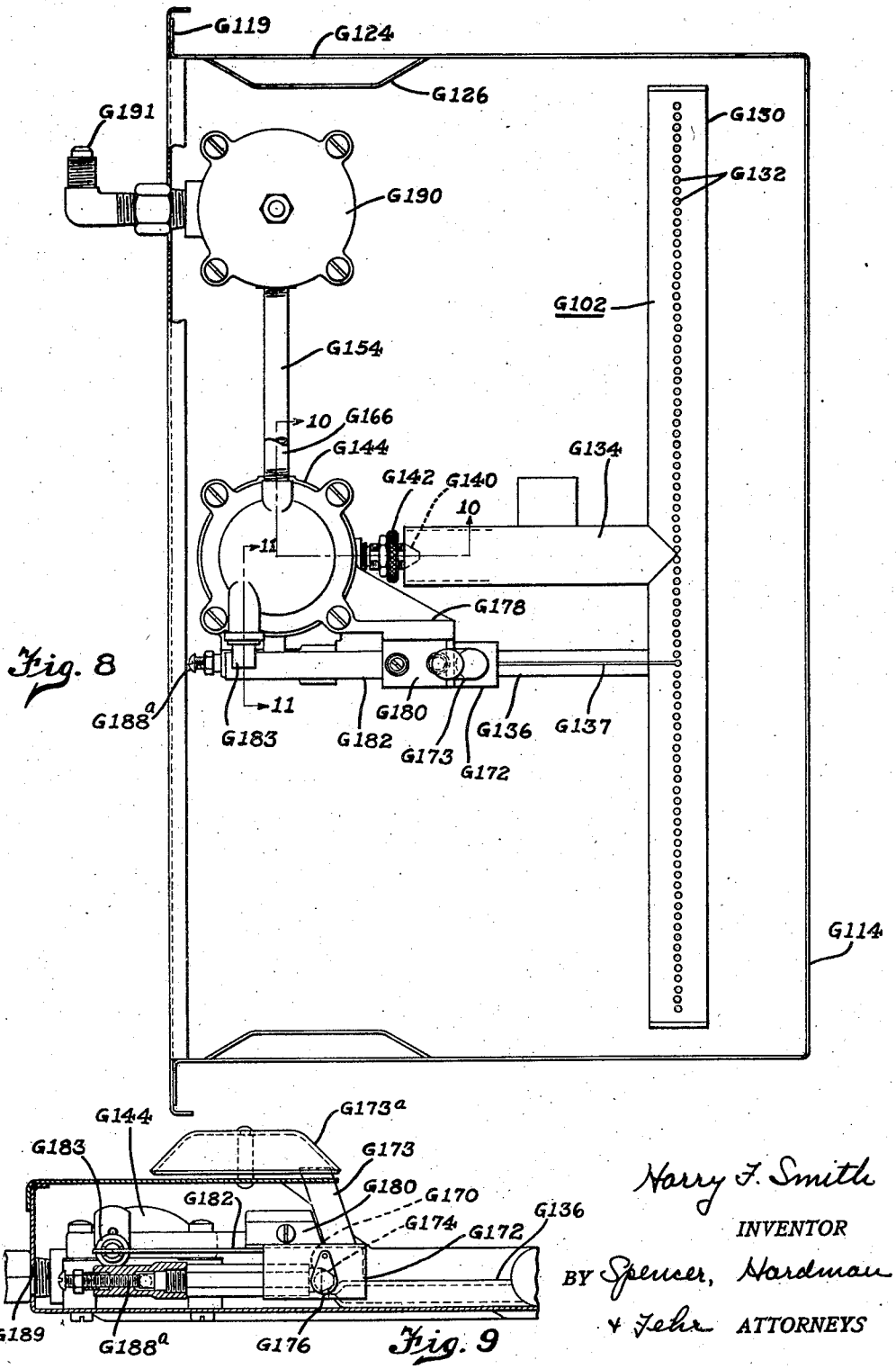

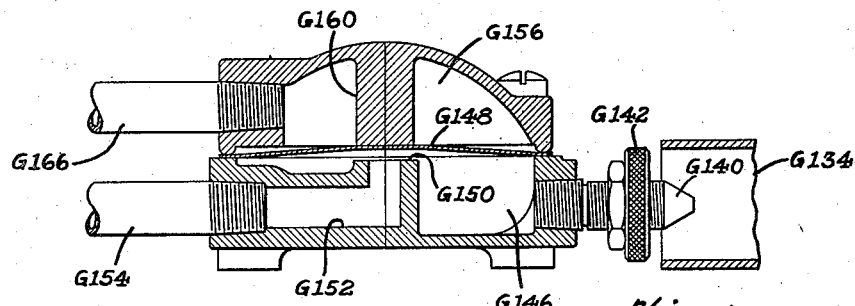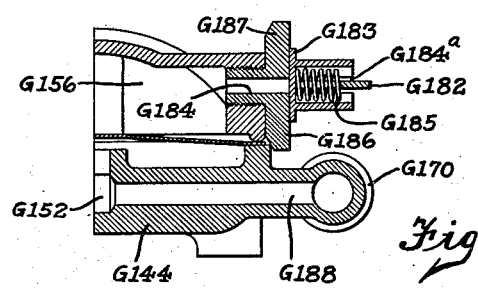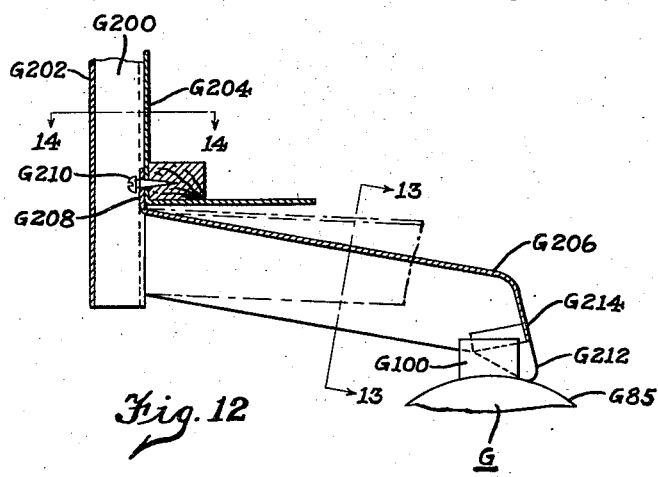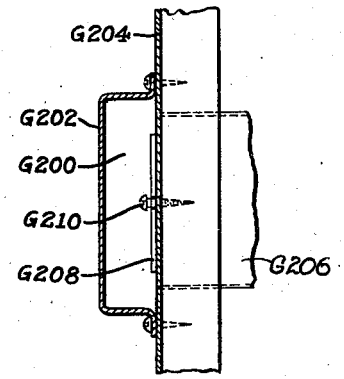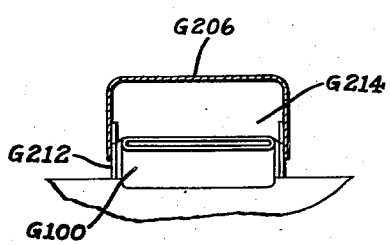

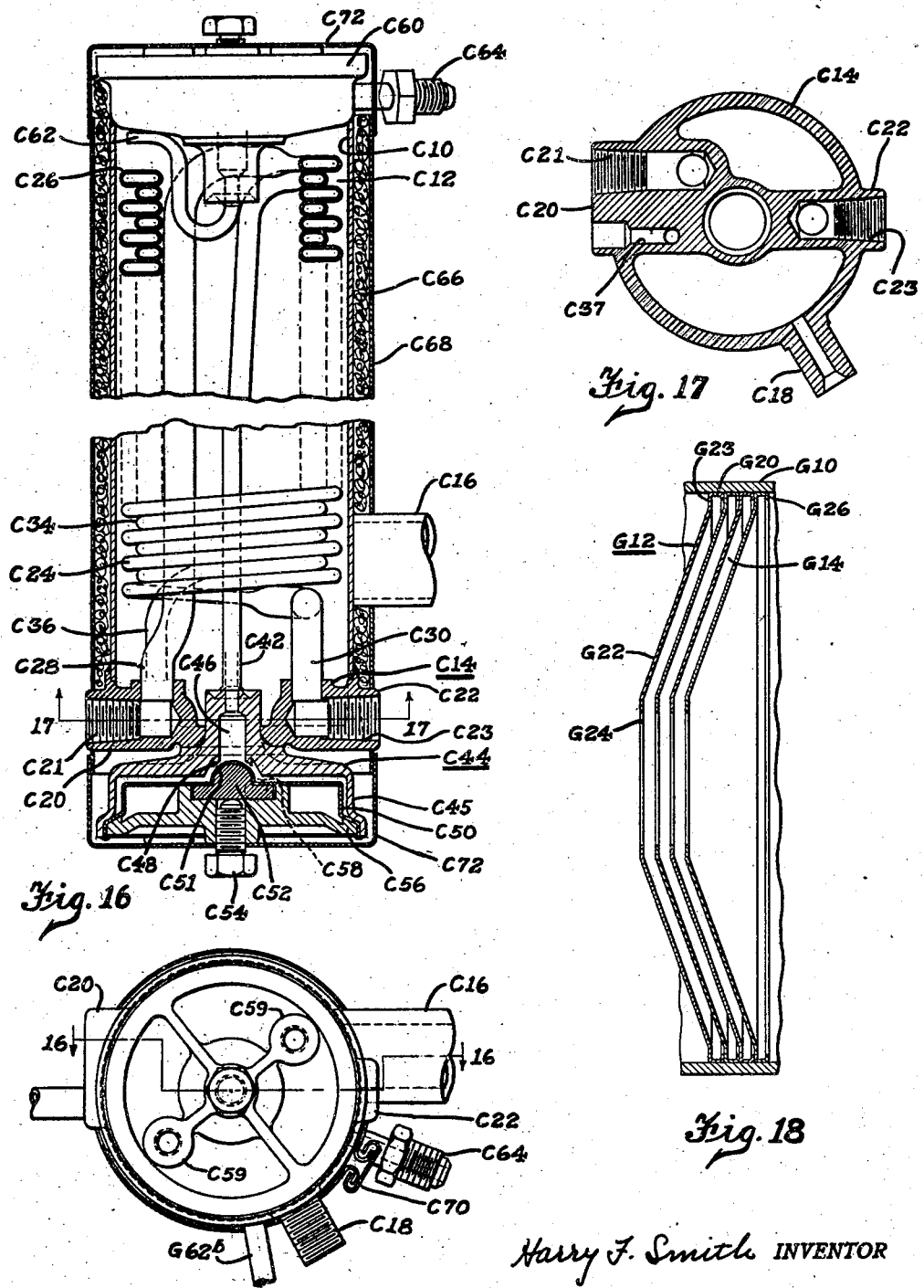

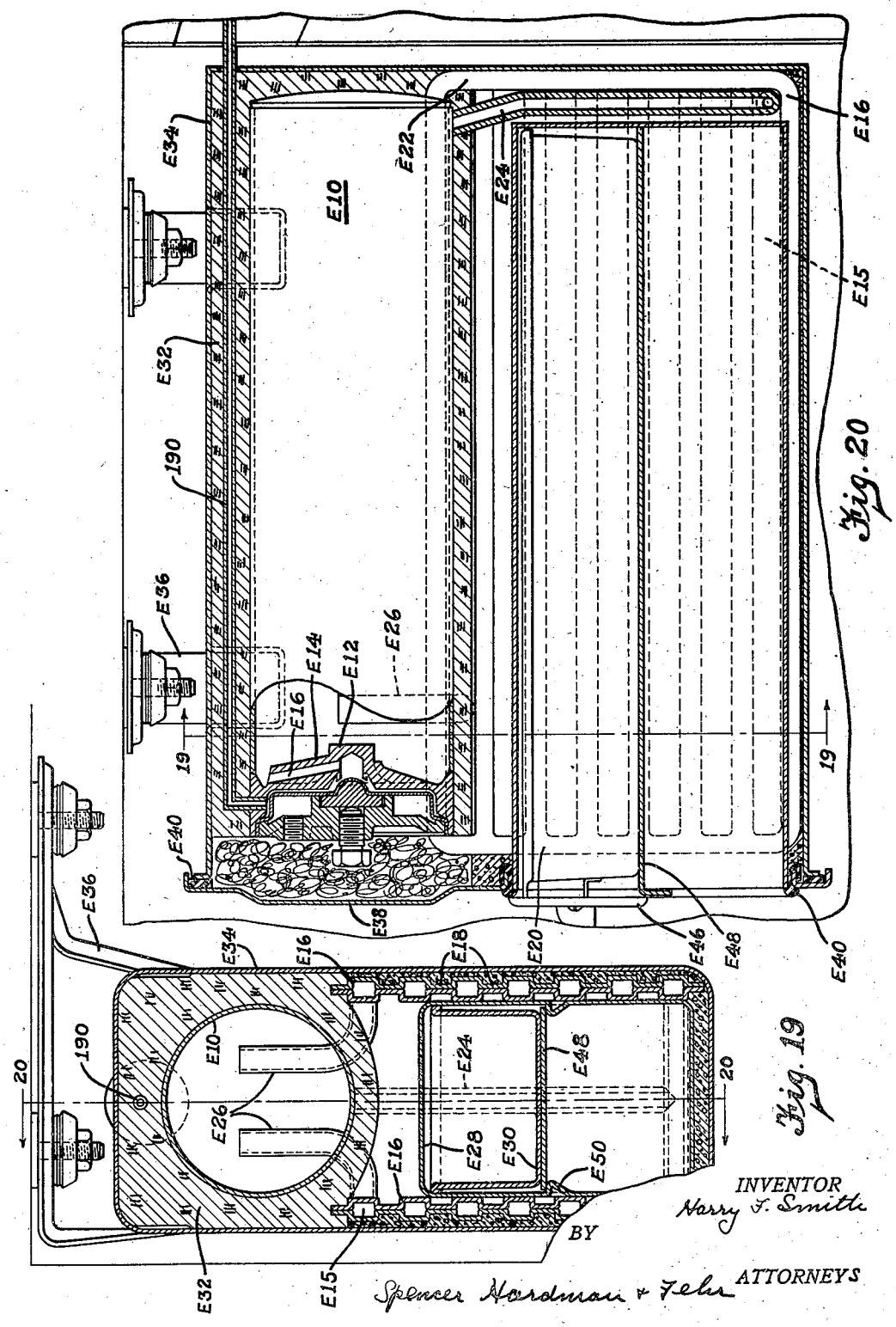

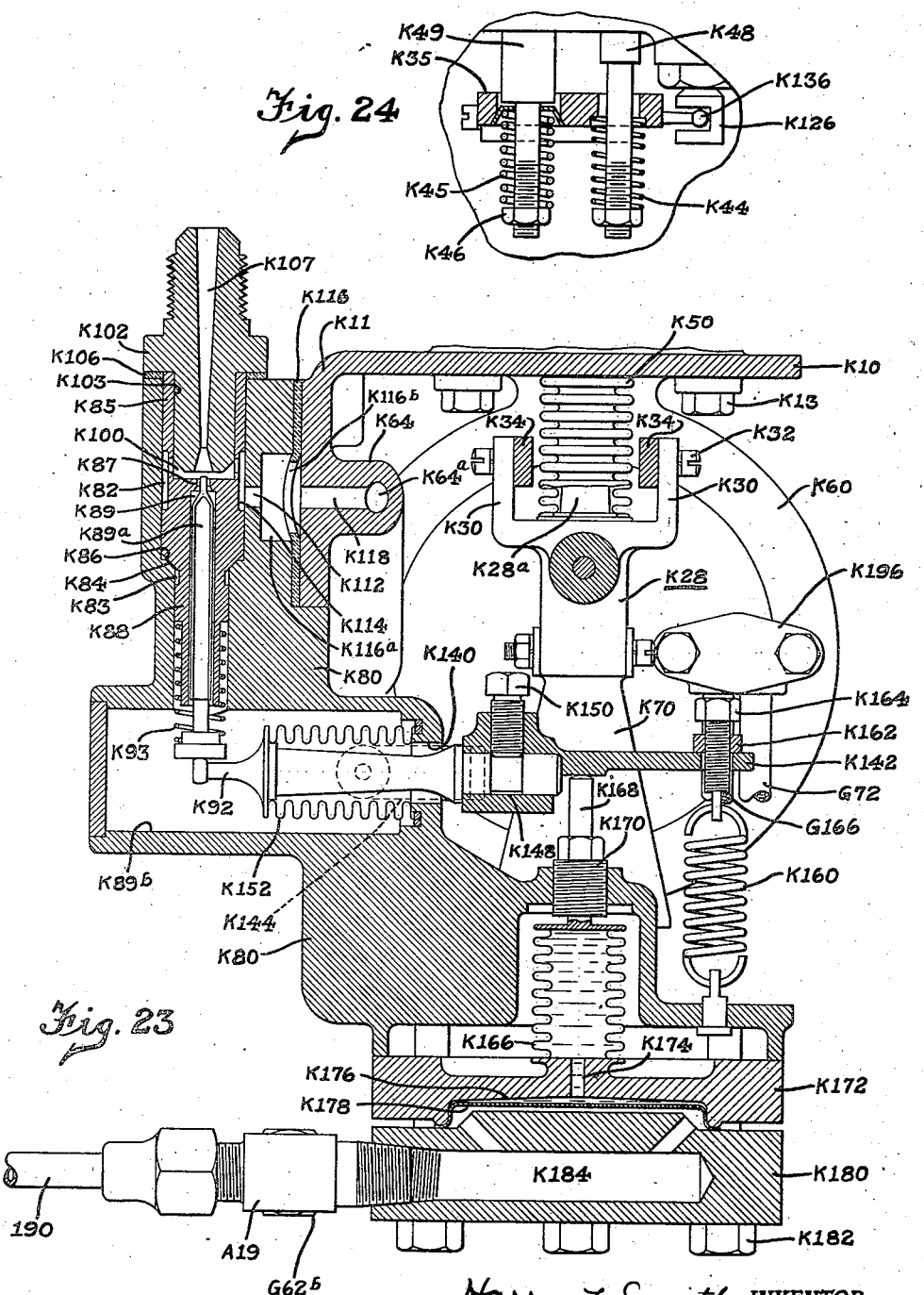

Aug. 4, 1936.  H. F. SMITH  2,049,782
REFRIGERATING APPARATUS
Original Filed Sept. 13, 1929    19 Sheets-Sheet 13
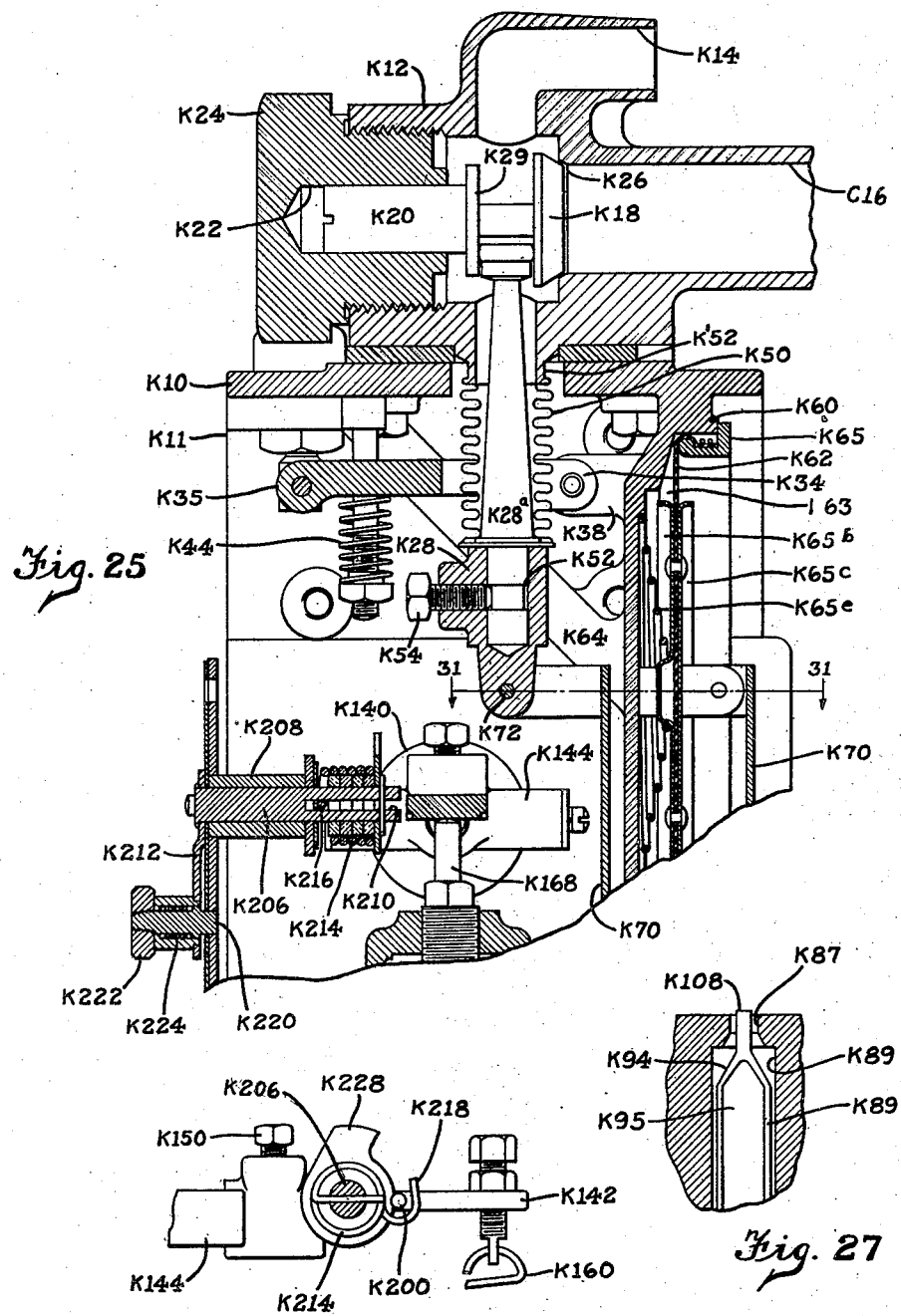

Aug. 4, 1936.  H. F. SMITH  2,049,782

REFRIGERATING APPARATUS

Original Filed Sept. 13, 1929   19 Sheets-Sheet 14

Harry F. Smith  INVENTOR

BY

Spencer Hardman & Fels ATTORNEYS

Aug. 4, 1936.  H. F. SMITH  2,049,782
REFRIGERATING APPARATUS
Original Filed Sept. 13, 1929   19 Sheets-Sheet 16

Harry F. Smith INVENTOR
BY
Spencer Nordman & Felu ATTORNEYS

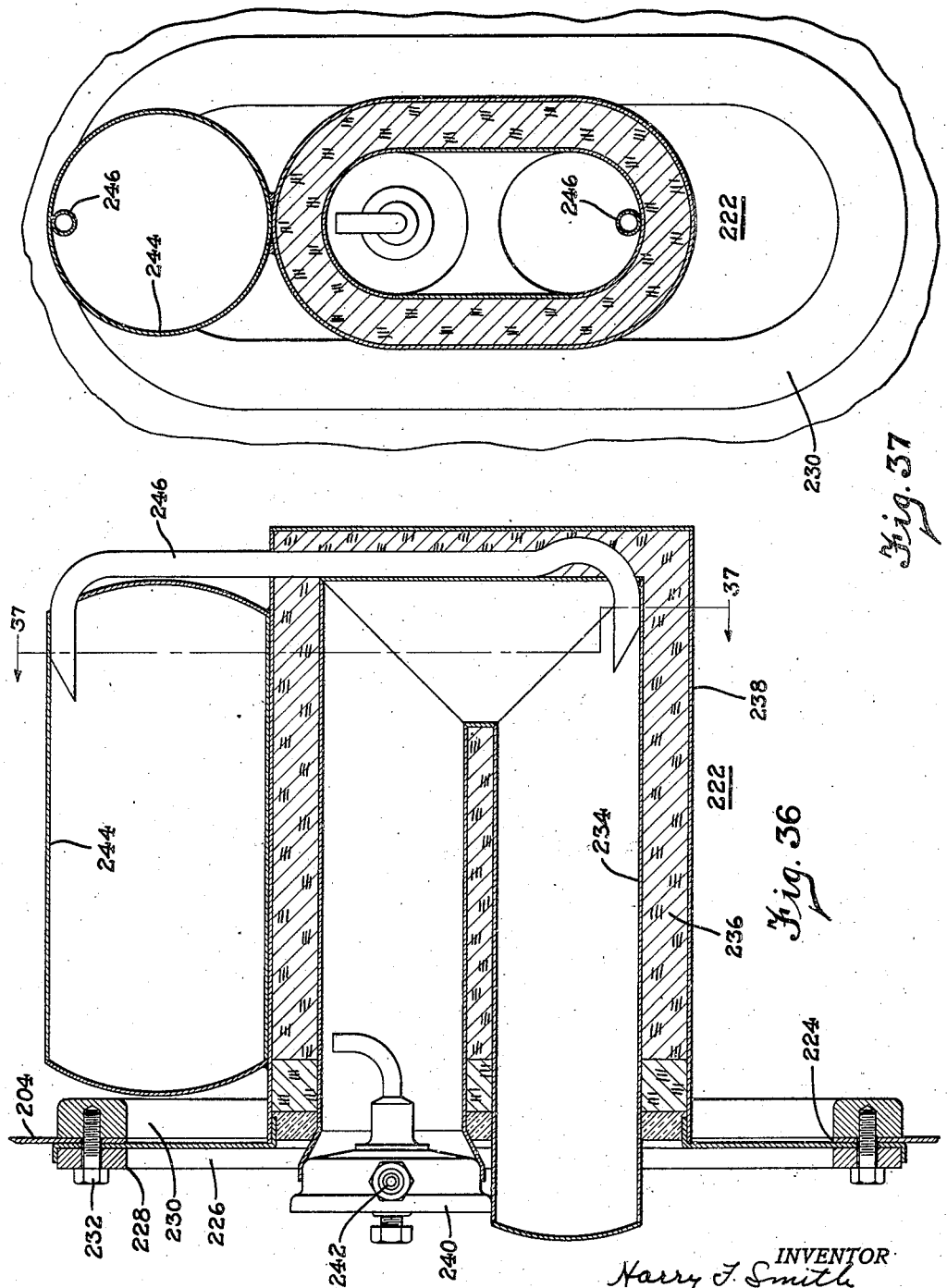

Aug. 4, 1936.  H. F. SMITH  2,049,782
REFRIGERATING APPARATUS
Original Filed Sept. 13, 1929  19 Sheets-Sheet 18

Harry F. Smith INVENTOR
BY
Spencer Hardman & Felix ATTORNEYS

Patented Aug. 4, 1936

2,049,782

UNITED STATES PATENT OFFICE 2,049,782

REFRIGERATING APPARATUS

Harry F. Smith, Dayton, Ohio, assignor, by mesne assignments, to General Motors Corporation, a corporation of Delaware Application September 13, 1929, Serial No. 392,341
Renewed November 16, 1934

28 Claims. (Cl. 62—5)

This invention relates to absorption refrigerating apparatus. It is more particularly concerned with that of the intermittent type wherein the generator-absorber is alternately heated and cooled to circulate refrigerant in a refrigerating system, but is not limited to this type.

It is among the objects of the invention to provide an improved method of and means for controlling the operation of an absorption apparatus which promotes safety and reliable functioning of the system; an improved method of and means for both heating and cooling an absorption system which is efficient and reliable in operation; an improved absorption system which is free from valves, pumps and similar moving parts for maintaining differences of refrigerant pressure; an improved arrangement for automatically controlling the operation of the system in response to the condition of the system, and to shut down the apparatus in the event of abnormal conditions; a control system in which leakage or failure of any part effectively prevents operation of the refrigerating system; an improved generator-absorber structure which facilitates the transfer of heat and which tends to maintain constant operating characteristics over long periods of time; an improved condensing arrangement, specifically one which may be used below the level of a refrigerating element which it supplies, and in which liquid refrigerant is not trapped; an improved condenser structure which condenses both refrigerant and a heat transfer vapor for cooling the generator-absorber; an improved structure of refrigerating element, an improved burner control apparatus, and various other features of novelty and improved constructions and arrangements of the component parts of the system, as will appear in detail in the description, drawings and claims.

Fig. 3 is a front elevation of a refrigerating cabinet equipped with refrigerating apparatus constructed in accordance with the invention;

Fig. 4 is a top plan view of a portion of the refrigeration mechanism shown in Fig. 3, drawn to an enlarged scale;

Fig. 5 is an end elevation of the apparatus shown in Fig. 4;

Fig. 6 is a longitudinal vertical section, partly in elevation of the generator-absorber unit;

Fig. 7 is a section of the generator-absorber on the line 7—7 of Fig. 6;

Fig. 8 is a plan of the burner and the associated control apparatus;

Fig. 9 is a side elevation, partly in section of the burner control valve;

Fig. 10 is a section on an enlarged scale of the burner control valve drawn on the line 10—10 of Fig. 8;

Fig. 11 is a section on an enlarged scale of the burner control valve drawn on the line 11—11 of Fig. 8;

Fig. 12 is a vertical section on an enlarged scale of the generator-absorber flue taken on the line 12—12 of Fig. 3;

Fig. 13 is a section of the burner flue taken on the line 13—13 of Fig. 12;

Fig. 14 is a section of the stack taken on the line 14—14 of Fig. 12;

Fig. 15 is an end elevation of the condenser, the end cap being removed;

Fig. 16 is a longitudinal horizontal section of the condenser on the line 16—16 of Fig. 15;

Fig. 17 is a section of the condenser on the line 17—17 of Fig. 16;

Fig. 18 is an enlarged section corresponding to Fig. 6 of a portion of the generator-absorber;

Fig. 19 is a vertical cross section of the refrigerating element shown in Fig. 3 drawn on the line 19—19 of Fig. 20;

Fig. 20 is a vertical longitudinal section of the refrigerating element on the line 20—20 of Fig. 19;

Fig. 23 is a section of a portion of the control mechanism on the line 23—23 of Fig. 22;

Fig. 24 is a section of a portion of the control on the line 24—24 of Fig. 22 showing the packing bellows springs;

Fig. 25 is a section of a portion of the control on the line 25—25 of Fig. 21;

Fig. 26 is a section of a portion of the temperature adjustment control on the line 26—26 of Fig. 22;

Fig. 27 is an enlarged section of the water valve of the control, corresponding to Fig. 23;

Fig. 36 is a section of the refrigerating element shown in Fig. 35 drawn on an enlarged scale along the line 36—36 of Fig. 35;

Fig. 37 is a section on the line 37—37 of Fig. 36;

Figures 1, 2:
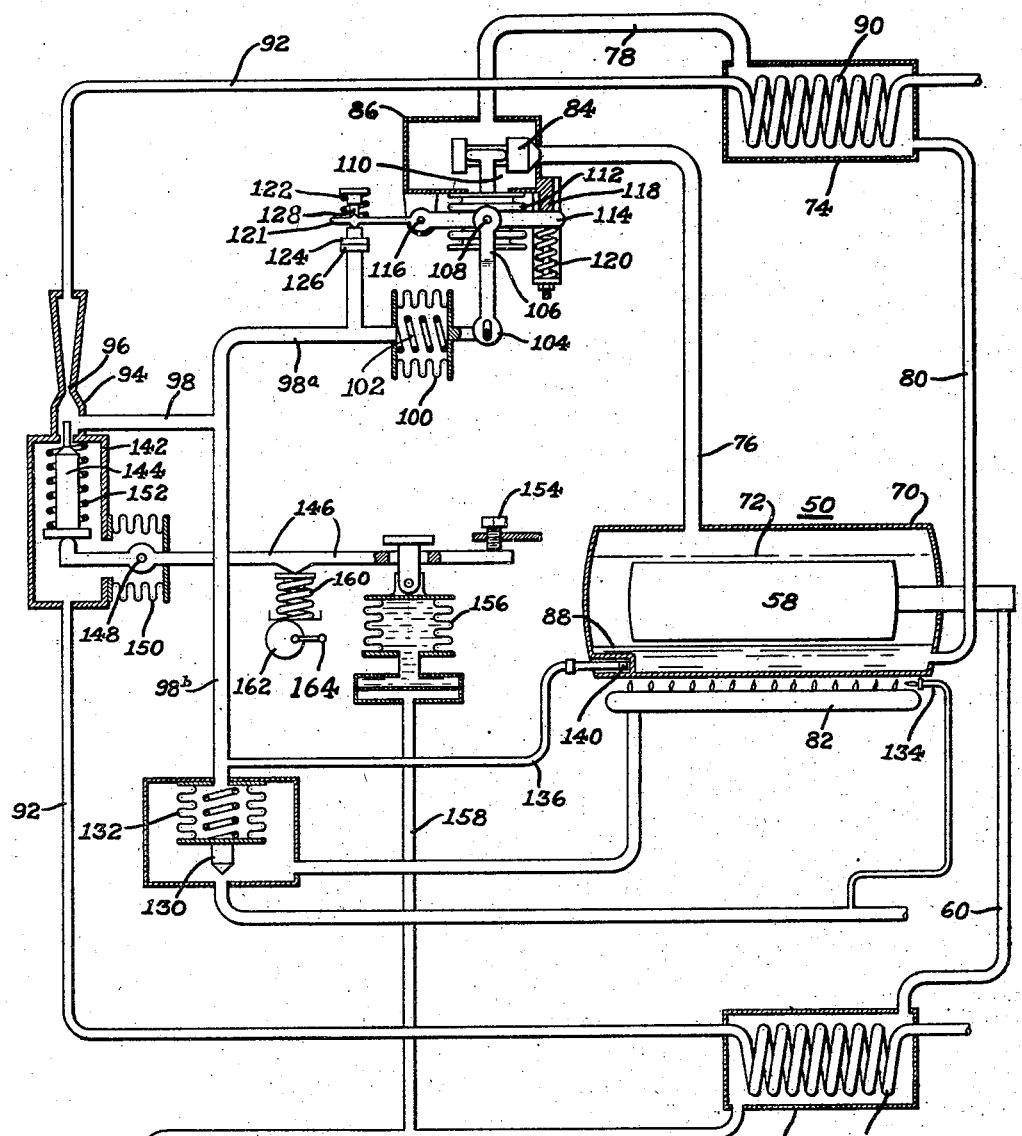
Fig. 1 is a diagrammatic representation of a refrigerating system embodying the invention.
Fig. 2 is a diagram of a modified arrangement of refrigerating element.

Referring to Fig. 1 the improved refrigerating system includes a generator-absorber generally designated by 50 which is automatically heated and cooled to supply refrigerant to a refrigerating element or evaporator 52 and to withdraw refrigerant from the element, which may be used to cool any suitable cabinet or compartment 54. A condenser 56 is interposed between the generator-absorber and the refrigerating element. The generator-absorber 50 includes any suitable container 58 for absorbent (the construction of which will be described in detail herein) which is connected by a refrigerant conduit 60 with the chamber 56 of the condenser which is cooled in any suitable manner for example by water or other cooling medium flowing thru a coil 62. Liquefied refrigerant flows from the chamber 56 thru a conduit 64 to the evaporator 52. When the generator-absorber is heated, gaseous refrigerant is given off, and will flow to and be condensed in the coldest part of the system. If the evaporator has previously been cooled by evaporation of refrigerant produced by an absorbing period, it will be colder than the condenser, hence refrigerant will tend to liquefy in the evaporator. In order to reduce the amount of condensation which can take place in the evaporator, the latter is formed as an insulated reservoir of small surface 66 having depending circulating and evaporating tubes 68 of large exposed surface which are maintained at all times filled with liquid refrigerant. Since the evaporating tubes are filled with liquid and since the reservoir is insulated, the heat of condensation of the refrigerant initially condensed will be confined to the reservoir and will speedily elevate its temperature above that of the condenser after which all condensation will take place in the condenser. The warm liquid will remain at the top of the evaporator and will not circulate. When the generator-absorber is cooled, the refrigerant in the reservoir will be evaporated, reducing the temperature of the reservoir to that of the tubes 68, after which continued cooling of the generator-absorber will produce evaporation in the tubes which are exposed to the atmosphere to be cooled.

Vapor heating and cooling circuit

A closed vapor circuit is provided for the purpose of heating and cooling the generator-absorber 58. The latter is enclosed in a container 70 herein termed a vapor shell which may be filled to an upper level 72 with volatile liquid such as alcohol or ethyl chloride and which is connected to a vapor condenser 74 above the level of the vapor shell by means of a vapor conduit 76—78 leading from the top of the vapor shell to the top of the condensing chamber, and a liquid conduit 80 leading from the bottom of the condensing chamber 74 to a point near the bottom of the container 70. The liquid in the vapor shell is vaporized by any suitable heating device herein exemplified as a gas burner 82 placed beneath the vapor shell. When the generator-absorber is to be heated the burner is lighted by automatic control means herein described in detail and a valve 84 is closed in a valve chamber 86 interposed between the sections 76 and 78 of the vapor conduit. When the burner begins to vaporize the liquid in the chamber 70, the pressure of the vapor forces the remaining liquid up thru the conduit 80 filling the condensing chamber 74 and reducing the level of the liquid in the chamber 70 to a point which may be below the generator-absorber 58 and is exemplified by the level 88. The liquid continues to be vaporized by the burner and condensed on the generator-absorber 58 giving up its latent heat and causing the absorbent to evolve its refrigerant.

The vapor condenser may be cooled by any suitable circulating medium such as water which preferably flows continuously thru a coil 90. When the generator-absorber is to be cooled, the burner is turned off and the valve 84 in the vapor conduit is opened. This permits the vapor in the vapor shell to pass into the vapor condenser and the liquid in the condenser to flow down into the container 70, again submerging the generator-absorber to the level 72. The hot generator-absorber vaporizes the liquid, the vapor flowing up thru the conduit 76 to be condensed again. This vaporization and condensation of the circulating liquid cools the generator-absorber to withdraw and absorb the refrigerant from the evaporator 52.

Control system

The invention contemplates suitable automatic control devices for cyclically heating and cooling the generator-absorber in response to the refrigerating demand or the conditions within the system. Preferably the cooling water circulates continuously thru both the refrigerant condenser and the vapor condenser since at any instant one of the other of the condensers must be cooled, and since the circulation of water thru either condenser does no harm when that condenser is not functioning as such. Water may enter the system at the refrigerant condenser cooling coil 62 and flow by a conduit 92 to the vapor condenser cooling coil 90.

In order to obtain the necessary power for actuating the control devices a jet or entrainment pump is placed in the water conduit 92. This pump includes a chamber 94 having a restriction or throat 96 into which a jet of water is discharged. Connected to the chamber 94 is a suction conduit system 98 in which a vacuum is maintained by the jet pump. Connected to the conduit 98a of the system is an expansible chamber motor 100 which is preferably formed of a bellows, the interior of which is connected with the conduit 98a but which is otherwise sealed from the atmosphere. The bellows may be expanded by a spring 102 when the pressure in the conduit 98 is not reduced, and may be collapsed by atmospheric pressure when a vacuum exists in the conduit. The end of the bellows is attached by a pin and slot connection to a lever 104 provided with a fork 106 which is pivoted at 108. Between the forks a portion 110 of the lever extends within the casing 86 for operating the valve 84, the lever being sealed to the casing by a flexible connection formed by a packing bellows 112 placed within the fork 106 and surrounding the portion 110 and sealed thereto. When a vacuum exists in the conduit 98, the bellows 100 collapses to close the valve 84, and when the vacuum is broken, the bellows expands to open the valve 84.

The pivots 108 of the forked lever 104 are mounted on a second forked lever 114, pivoted at 116 and also surrounding the packing bellows 112, which may expand and contract with changes of pressure in the valve casing 86. The fork 114 may move up and down about the pivot 116 and is urged against a stop 118 by a spring 120. The fork 114 has an arm 121 extending to the left of the pivot thru which freely passes a valve stem 122 carrying a vacuum-breaking valve 124 which may cooperate with a seat 126 to close the vacuum conduit system from the atmosphere. The valve may be closed by downward movement of the arm 121 when the packing bellows collapses due to low pressure in the valve casing 86. The valve may be opened by upward movement of the arm 121 when the packing bellows expands due to high pressure. A light spring 128 is interposed between the arm 121 and the valve stem to raise the valve away from its seat once it has been opened.

The gas burner 82 is controlled by a gas valve 130 attached to a bellows 132, similar to the bellows 100, which is also connected to the vacuum conduit system 98 and is collapsed to open the gas valve when the vacuum is produced and is expanded to close the gas valve when the vacuum is broken. The burner is lighted when the valve is open from a constantly burning pilot 134. The vacuum conduit system includes a high temperature safety conduit 136, the end of which is normally closed by a fusible plug 140 disposed in a well in the vapor shell 70. This is for the purpose of breaking the vacuum to shut off the burner in case of an excessively high temperature in the vapor shell.

It will be appreciated that the rate at which refrigeration is evaporated depends on the rate of absorption by the absorber 58, which in turn depends upon the rate at which the absorber is cooled. This of course is directly dependent upon the temperature and rate of flow of cooling water. Consequently the rate at which refrigeration is produced can be controlled directly by controlling the flow of cooling water. For this purpose a valve casing 142 containing a throttle valve 144 is interposed in the conduit 92. This valve is actuated by a lever 146 pivoted at a stationary point 148, sealed to the casing by a packing bellows 150 and urged counter-clockwise by the spring 152 which serves to open the valve. The maximum opening of the valve is determined by an adjustable stop 154. The lever 146 is rotated clockwise to throttle the water in response to the temperature of the evaporator by means of a bellows 156 which is connected to the conduit 64 by a conduit 158. The pressure of the evaporator and consequently the pressure in the bellows 156 is a function of the temperature of the evaporator. Consequently when the evaporator has been reduced to the desired temperature the bellows 156 collapses to throttle the supply of cooling water which slows down the refrigeration rate to that required to maintain the desired temperature. If refrigeration at a greater rate is demanded the evaporator tends to become warm and its pressure is increased permitting the bellows 156 to expand somewhat and permitting the valve to open to produce absorption at an increased rate.

Operation of the system

When the apparatus is first started the refrigerator cabinet is warm and the generator-absorber is charged with refrigerant. The bellows 156 is expanded and the rod 146 consequently in the position shown in Fig. 1 which permits the maximum flow of water thru the condensing circuit. The flow of water produces a sufficiently low pressure in the vacuum conduit system 98 to collapse the vapor valve bellows 100 to close the vapor valve 84, preventing the circulation of the heating and cooling fluid. Likewise the gas valve bellows 132 is collapsed to open the gas line and supply the burner 82 which is lighted by the pilot 134. The liquid in the generator-absorber chamber 70 now stands at the level 72 but a small quantity of this liquid is soon vaporized and the remaining liquid forced thru the liquid conduit 80 into the vapor condenser 74 where it remains inert. This reduces the level of the liquid in the vapor shell to 88. Vaporization of the liquid continues and the vapor is condensed on the generator-absorber 58 heating the latter as has been explained.

I prefer to use in the generator-absorber solid absorbent material which takes up ammonia, for example calcium chloride. These materials possess the property of forming definite chemical compounds with ammonia, which are called broadly addition-compounds and in the specific case of the materials under consideration are called ammines or ammoniates. Using calcium chloride as an example, this material has the property of forming an addition-compound of high order in which 8 molecules of ammonia are combined with one molecule of calcium chloride, according to the formula $CaCl_2.8NH_3$, called calcium chloride 8-ammine. This is the material with which the generator-absorber is charged at the moment under consideration. Upon being heated this material evolves or gives off ammonia and if the ammonia is removed or condensed at a constant rate, the evolution will continue at a constant temperature and pressure until all of the compound has been changed to an addition-compound of lower order, this being calcium chloride 4-ammine of the formula $CaCl_2.4NH_3$. Continued heating of the absorbent material at the same temperature and pressure will cause no change in its composition, but by increasing the temperature to a definite higher point ammonia will again be given off until all of the compound has been converted into a still lower addition-compound, namely, calcium chloride 2-ammine, $CaCl_2.2NH_3$. Upon reversing the process, that is cooling the generator-absorber, the 2-ammine absorbs ammonia at a constant temperature and pressure until all of the substance has been converted into the 4-ammine and then if the temperature is lowered still further the absorption of ammonia will continue until all of the compound has been converted back into the 8-ammine.

Since a relatively high temperature is required to dissociate the 4-ammine into the 2-ammine it is preferable for economic reasons to cyclically heat and cool the absorbent between definite limits determined by the addition-compounds, for example the condition of 4-ammine and 8-ammine as disclosed in the Keyes Patent 1,698,847, dated January 15, 1929. The reason for this is that while the latent heat of dissociation of compound from the 4-ammine to the 2-ammine may be the same as the latent heat of dissociation from the 8-ammine to the 4-ammine, the 4-ammine is obtained at a relatively low temperature which involves relatively small loss due to the specific heat of the mass of the apparatus in being heated to this low temperature, and the quantity of ammonia obtained is relatively large, being represented by 4 molecules. On the other hand the specific heat required to heat the mass of the apparatus to the temperature required to dissociate the 4-ammine into the 2-ammine is relativey large and the amount of ammonia obtained is relatively small, being represented by 2 molecules. It is therefore apparent that it may be uneconomical to drive off or evolve ammonia beyond the condition represented by the 4-ammine.

When the liquid is being vaporized in the chamber 70 and the vapor comes in contact with the generator-absorber the latter absorbs from the vapor an amount of heat equivalent to the latent heat of dissociation of 4 molecules of ammonia from the compound $CaCl_2.8NH_3$ and condenses a corresponding quantity of vapor. Dissociation proceeds at a constant temperature and absorbs heat at a constant rate, the temperature and pressure of the vapor in the chamber 70 remaining practically constant. When, however, a predetermined amount of refrigerant has been evolved, which is represented by the assumption of the absorbent material in its entirety of the condition of the lower order addition-compound $CaCl_2.4NH_3$, the absorption of latent heat by the generator-absorber at that temperature will cease and the temperature and pressure of the heating fluid will immediately rise. It will thus be seen that a predetermined high pressure or temperature of the vapor represents a predetermined high temperature of the generator-absorber which in turn represents the evolution of a predetermined amount of refrigerant and the conversion of the entire mass of the absorbent material to an addition-compound of lower order.

As the pressure of the vapor increases, the packing bellows 112 on the valve operating lever 104 expands against a force of the spring 120, raising the arm 121. As the arm is raised, the spring 128 around the vacuum valve stem is compressed, but the force of the spring is insufficient to overcome the suction on the vacuum valve and the latter remains closed. However at a definite high pressure of the vapor in the chamber 70, which is determined by the setting of the spring 120, the bellows 112 expands sufficiently to move the arm 121 into positive engagement with the head of the vacuum valve stem. This high pressure represents the evolution of a predetermined amount of refrigerant and the conversion of the entire mass of the absorbent material to an addition compound of lower order. At this point the vacuum valve is positively opened, breaking the vacuum and permitting the two bellows 100 and 132 to suddenly expand. This opens the vapor valve 84 in the conduit 76—78 and simultaneously closes the gas supply to the burner 82. As soon as the vacuum valve is open the spring 128 lifts the valve away from its seat in order that subsequent contraction of the bellows 112 will not immediately seat the valve but will permit it to remain open until a predetermined low temperature of the absorber has been reached. The generator-absorber is now cooled by the circulation of fluid in the vapor circuit as has been previously described. As the cooling progresses, refrigerant evaporates in the evaporator and cools the refrigerator cabinet. As the cabinet cools the bellows 156 collapses.

The rate of cooling the generator-absorber, which is determined by the rate of flow of cooling water is what regulates the rate of refrigeration in the cabinet. Any tendency to cool the cabinet below the selected temperature will be counter-acted by diminishing the flow of cooling water thru contraction of the bellows 156 and any tendency to cool too slowly (which will result in an increased cabinet temperature) will be counter-acted by increasing the flow of cooling water thru expansion of the bellows. Thus the apparatus will tend to maintain a uniform temperature. The value of the uniform temperature can be determined by the setting of the cam 162 which may vary the tension of the spring 160 between zero in which position it is entirely removed from the lever 146, and the maximum tension of the spring. At a selected minimum permissible cabinet temperature, the bellows 156 positively closes the valve 144 completely to stop the flow of cooling water and suspend refrigeration until the cabinet has warmed somewhat. Eventually a predetermined amount of refrigerant will be evaporated and absorbed in the generator-absorber, this condition being represented by the assumption of the material in the generator-absorber of the condition of the higher order addition compound $CaCl_2.8NH_3$. Further cooling of the generator-absorber produces no refrigeration because no more refrigerant can be absorbed. After this point the generator-absorber ceases to give up latent heat of absorption of the ammonia and consequently ceases to vaporize the cooling liquid. Consequently the pressure of the vapor in the conduit 76 suddenly drops and permits the bellows 112 to colapse to the point which will close the vacuum valve 124. When this occurs the vapor valve bellows 100 and the gas valve bellows 132 are both collapsed to open the gas valve and close the vapor valve and start the heating phase of the cycle, which cycle repeats itself automatically in response to the condition of the system.

It will be noticed that the heating of the system depends in all instances upon maintaining the vacuum in the conduit system 98. Thus any failure of the apparatus will tend to prevent heating of the generator-absorber and thus promote safety. For example if the water supply should fail or drop to a rate of flow inadequate for condensing purposes, a vacuum will not be established and the burner can not be lighted. Likewise should condensing water be available but should it be prevented from flowing by any cause such as stoppage beyond the condenser, a vacuum will not be maintained and the apparatus will be shut down. Similarly should a leak occure in the control system due to accident, or should a bellows crack from wear or other causes a vacuum can not be established.

The conduit 80 communicates with the vapor shell 70 at a point near to but above the bottom, that is at a point slightly below the level 88. Therefore if a leak should occur in the vapor circuit and the quantity of liquid should be reduced to the level of the outlet of the conduit 80, then when the vapor is generated, it can rise in the conduit 80 and prevent proper heating of the generator-absorber 58. This will fail to distill refrigerant and the lack of refrigeration will indicate that something is wrong with the apparatus.

If for any reason the generator-absorber should be heated to an abnormally high temperature, for example by reason of damage to the apparatus resulting from leakage out of the system of a sufficient amount of heating and cooling fluid, the fusible plug 140 will melt and open the vacuum line.

The temperature at which the cabinet will be maintained can be adjusted by regulating the temperature at which the valve 144 will be actuated and the amount of movement of this valve. This can be accomplished by adjusting the tension of the spring 152 but I prefer to provide an independent cold control in the form of the separate spring 160 which may be brought into play when desired to resist the movement of the control lever 146 and the tension of which may be suitably adjusted by any convenient mechanism such as the cam 162 operated by the lever 164. In this manner the spring tension on the lever 146 may be simply adjusted, and yet the normal adjustment, that is the tension of the spring 152, will remain undisturbed when the cold control adjustment is removed.

Fig. 2 shows a modified form of the refrigerating element generally designated by 52 in Fig. 1. The pipe 64a, corresponding to pipe 64 in Fig. 1, delivers liquid refrigerant to the top of a receiver 66a which is encased in insulation 67a to prevent transfer of heat into and out of the receiver. The bottom of the receiver 66a is connected by a pipe 160 with the top of an evaporator 68a which may be, for example, a receiver to the outside of which are attached thermally conducting fins 162. The evaporator 68a may be placed above the level of the receiver 66a, or anywhere desired.

When the absorbent in the generator-absorber is completely saturated with ammonia there is enough liquid ammonia remaining in the circuit to fill either the evaporator or receiver which are preferably of about the same capacity. Suppose that when the apparatus is first started the lower receiver 66a is filled with liquid ammonia and the absorbent in the generator-absorber is completely saturated with ammonia. At the beginning of the generating period the hot gaseous ammonia entering the receiver creates sufficient pressure to force the liquid ammonia up into the evaporator 68a. The evaporator is then filled and consequently condensation of ammonia can not take place therein. The hot gaseous ammonia entering the receiver soon raises the temperature above that of the condenser after which condensation occurs in the condenser, liquid ammonia flowing to the receiver 66a until the latter has been filled or until the generator-absorber stops emitting ammonia.

At the beginning of the absorbing period the low pressure produced by the absorbent begins to evaporate ammonia in the receiver 66a. This quickly reduces its temperature below that of the evaporator, and since the receiver is insulated to prevent the transfer of heat thereto, evaporation will take place in the evaporator, the ammonia vapor bubbling through the liquid in the receiver and passing to the absorber. At the termination of the absorbing period the receiver will be substantially filled and the evaporator may be empty. At the beginning of the next succeeding generating period the liquid in the receiver will be forced into the evaporator. This arrangement forms an effective thermal check valve which permits heat to flow from the evaporator into the refrigerating system but prevents the transfer of heat from the refrigerating system to the evaporator and its surroundings. Because the receiver is insulated it may be placed in any convenient location which may be, if desired, in the compartment to be cooled by the evaporator.

Structure of the apparatus

Fig. 1 is a simplified diagrammatic illustration of one form of apparatus by which the invention may be accomplished and has been selected for the purpose of explaining the operation of the system. In Figs. 3 to 32, I have shown one form of actual construction and arrangement of the apparatus. Fig. 3 shows a refrigerating cabinet 180 in which the refrigerating apparatus constructed in accordance with the invention is installed. This cabinet has a cooling compartment 182 and food storage compartments 184 and 186 which communicate with the cooling compartment in the usual manner. Within the cooling compartment is placed a refrigerating element generally denoted by E which corresponds to the refrigerating element 52 of Fig. 1. The cabinet also includes a machine compartment 188 in which is placed the condensing unit which includes the generator-absorber generally designated by G, the condenser generally denoted by C and the control mechanism K as will be described in detail. The refrigerating element is connected to the condensing element by means of the ammonia pipe 190 which corresponds to the conduit 64 in Fig. 1.

The generator-absorber G

Referring generally to Figs. 6 to 14 inclusive, and 18, the generator-absorber proper may be in the form of a cylindrical container or shell G10 corresponding to the container 58 of Fig. 1 provided with transverse partitions G12 dividing the container into cells for the reception of absorbent and having a bleeder tube G16 running down the center of the container and communicating with each cell for the purpose of admitting or withdrawing refrigerant. As shown best in Fig. 18, I have provided a plurality of circular pans G12 each of which has a cylindrical side wall G20 and a frusto conical bottom G22 joined to the side wall by a circular flange G23 and having a circular central opening G24. At the top of each side wall is a circular flange G26 projecting inwardly from the cylindrical side wall. These pans are stacked together as shown in Fig. 18 to provide the cells G14 referred to. The pans are held in this assembled relation by any suitable means such as a temporary clamping arbor and are inserted into the shell G10 and united in intimate thermal contact therewith. Preferably the outside of the cylinder formed by the assembled stack of pans is coated with a mixture of pulverized solder and a flux and the shell G10, which when cold is slightly smaller in internal diameter than the external diameter of the walls G20, is heated above the soldering temperature, and the stack of pans is plunged into the shell. At the high temperature of the shell, each pan is soldered to the shell and as the shell cools it shrinks upon the pans to form an intimate thermal bond.

The arrangement described is provided with an end plate G38, and the shell is formed with a frusto-conical bottom G40 having a cylindrical connecting flange G42. The end plate G38 is placed in the enlarged open end of the shell G10 and the latter is crimped to hold the end plate in position as shown at G43, after it is securely soldered to the end plate G38 to prevent leaks. Preferably the pans and shell G10 are formed of a good heat conducting material such as copper, and the outside surface of the shell is sandblasted to roughen it and so provide a good heat transfer surface. A nipple G44 is brazed to the connecting flange G42. This nipple permits the insertion of the bleeder pipe G16 referred to above. After the generator-absorber structure has been assembled as described, the cells G14 are charged with suitable absorbent material and the bleeder tube is inserted in the aligned openings G24 through the nipple G42. The bleeder tube consists of the pipe G16 provided with perforations G50 disposed along its length so that one or more perforations communicate with each cell between the partitions. The tube G16 is covered with a suitable straining sleeve G52 of porous material such as asbestos, alundum, porous clay, fine Monel screen or the like.

The bleeder tube proper is preferably constructed of a flat sheet of material in which the holes G50 are punched and which is coiled into a tube by drawing it thru a die. The shape of the holes and their arrangement, that is narrow along the length of the tube and relatively far apart when aligned in this direction, facilitate the drawing of a tube of accurate cylindrical shape without breaking or cracking the metal between the holes.

The provision of the strainer sleeve is important to prevent the transfer of the absorbent from one cell to another for the following reason. The lower orders of addition-compounds take up a relatively small amount of space but expand upon absorbing the refrigerant in forming the higher order addition-compounds. It has been found that if the absorbent is confined, this expansion exerts tremendous force. Consequently the material is distributed throughout the cells so as to provide room in each cell for the necessary expansion. However, if the material in one cell should in any way be moved into another cell, for example by vibration due to transportation or other causes, then some cells would have too much material in the condition of lower order addition-compounds, and this material upon subsequent expansion would not have sufficient room. This has been found to exert sufficient force to distort the partitions and cause many other undesirable results.

The partitions are made of frusto-conical form so as to provide an inherently rigid structure which tends to oppose deformation produced by the expansion of the absorbent. The partitions are assembled with the apices of the cones toward the open end of the shell, that is, toward the connection G42 in order to facilitate filling of the cells with absorbent.

The generator-absorber is sealed in a container G53 which corresponds to the container 70 of Fig. 1 and which is preferably a steel shell the ends G54 and G56 of which may be welded in place after the generator-absorber has been inserted. The shell or container G53 is provided near one end with a series of depressions G58 circumferentially arranged which support the end of the container G10 in the center. The end plate G56 is stamped to form a collar G60 which surrounds the flange G42 and is brazed thereto to form a gas tight joint.

The end of the bleeder tube G16 is provided with a cup G61 having a flange which clamps the straining sleeve G52 in place and supports the bleeder tube in the center of the connection G44. The end of the connection G44 is closed by a suitable cap G61a and a refrigerant pipe G62 corresponding to the pipe 60 in Fig. 1 is connected to the flange G44 and leads to the refrigerant condensing chamber of the condenser C. To the lower side of the end plate G56 is welded a stud G64 which has a passage G65 opening into the shell G53 thru a suitable opening in the end plate. This stud is placed near the bottom of the vapor shell and constitutes the liquid return connection from the vapor condensing chamber of the condenser C. A conduit G64a shown in Fig. 5 is welded to the stud so as to communicate with the passage G65 and constitutes the liquid return conduit corresponding to the conduit 80 in Fig. 1. A short pipe G66 is welded around an opening in the top of the shell G53 and forms a vapor outlet which is connected to a conduit G68 (see Figs. 4 and 5) which corresponds to the conduit 76 in Fig. 1 and leads to the vapor control valve casing as will be described. The stud G64 is provided with a well G70 which corresponds to the well in the shell 70 of Fig. 1 and receives the end of a tube G72 which is closed by a fusible plug G74 corresponding to plug 140 in Fig. 1. The other end of the tube is connected to the vacuum system of the control apparatus and corresponds to the conduit 136 of Fig. 1.

The vapor shell and its contained generator-absorber are supported in end brackets G76 by the connection G44 and a hollow stud G80 both of which pass through suitable openings in the end brackets. The stud G80 is welded around an opening in the end G54 and provides a suitable vent or conduit for drying, evacuating and charging the vapor shell with the heating or cooling fluid, and is normally closed by a ball G81 held firmly on a seat by a set screw G81a. The end brackets G76 are provided with outwardly extending feet G82 (see Figs. 5 and 7) having inturned flanges G83 which form supporting feet for the entire apparatus. The brackets are also provided with suitable hand holes G84 by which the apparatus may be conveniently handled. The brackets G76 form the ends of a generally cylindrical casing which includes the cylindrical outer shell G85, the casing being held together by through bolts G88. The vapor shell within the casing is substantially surrounded by semi-cylindrical insulating members G90 shown best in Fig. 7 which are spaced from the shell to provide an angular gas passage G92 for heating the shell as will be explained. The members G90 are held in spaced relation around the vapor shell by through bolts G88 which pass through the insulating members. The ends of the angular gas passage G92 are closed by insulating plugs G94 filling the space between the ends of the vapor shell and the end brackets G76. The space between the outer surfaces of the insulating members G90 and the shell G85 may be filled with any suitable insulating material such as sheet asbestos, moulded asbestos blocks or the like G95. An opening G96 into the bottom of the passage G92 is provided by spacing apart the lower edges of the semi-cylindrical members G90 as well as the edges of the outer shell G85. The upper edges of the semi-cylindrical members are also spaced apart to provide the opening G98 which communicates with a gas outlet collar G100 welded to the top of the shell G85 and adapted to be connected to any suitable flue or stack.

A burner G102 which corresponds to the burner 82 of Fig. 1 is placed beneath the opening G96 for heating the vapor shell. The products of combustion from the burner pass upwardly around both sides of the shell through the space G92 and out through the connection G100. A drip shield G101 is welded to the bottom of the vapor shell directly above the burner to prevent the dripping onto the burner of water condensed out of the products of combustion by the cold vapor shell when the burner is first lighted. This shield includes a pair of troughs which can hold all of the water which will be condensed until the shell becomes too warm to condense the water, after which the water held in the troughs will be evaporated. This shield also catches any water which may be condensed on the vapor shell from the atmosphere during the cooling period when the heating and cooling liquid is being cooled to cooling water temperature, and thus prevents water from dripping into the burner during its idle period which might possibly stop the gas outlet holes and prevent proper lighting of the burner when turned on.

The insulating members G90 are preferably made of refractory material such as clay, porcelain, briquetted zonolite and water-glass or the like, which becomes incandescent upon being heated so as to radiate heat to the vapor shell. For this purpose the inner surfaces of the cylindrical members are preferably provided with ridges or points G104 which form incandescent radiating members and increase the surface of the radiating body. In this manner the vapor shell absorbs heat by direct contact with one side of the gas stream and the insulation absorbs heat by direct contact with the other side of the gas stream. A large proportion of the heat absorbed by the insulation is radiated across the gas stream to the vapor shell. This arrangement in effect increases the amount of surface available to absorb heat from the gas stream and transfer this heat to the vapor within the shell.

The burner

Referring particularly to Figs. 6 to 9, the supporting feet G83 on the end brackets G76 run transversely across the apparatus to provide a guideway for a removable drawer G114 which supports as a unit the burner G102 and its associated control apparatus. The drawer is provided with sides G116 and a front G118 which latter extends beyond the sides to form stops G119 cooperating with the feet G83 of the brackets G76 to position the burner directly under the opening G96 when the drawer is inserted in the guideway. The flanges G83 are provided with upturned ends G120 over which the drawer is slid when being placed in position and which cooperate with the front of the drawer to hold the drawer in place. The drawer is provided with a removable cover G122, which encloses the burner forming a burner chamber, and the sides G116 are provided with openings G124 opposite the forward hand holes G84 which serve to admit air to the burner chamber and are provided with louvers or covers G126 (see Fig. 8) which prevent any draft directly across the burner drawer which might blow out the pilot to be described.

The burner proper preferably consists of a pipe G130 closed at its ends and provided along its upper side with perforations G132 for the escape of gas, and having a T-connection G134 which forms the mixing tube for gas and primary air. The burner is also provided with an igniting tube G136 which leads to the pilot, to be described, and has a saw-cut G-137 along its upper side to form a gas outlet for carrying the flame from the pilot to the openings G132.

The burner control as shown in Figs. 8 to 11 includes a jet tube G140 for admitting gas to the mixing tube G134 provided with a threaded adjusting collar G142 by which the amount of primary air supplied to the burner may be regulated. A two-part valve casing G-144 includes gas chamber G146 with which the jet G140 communicates, and one side of which is formed by a flexible diaphragm G148 clamped between the two parts of the casing and normally closed, by its inherent elasticity, on a seat G150 around a gas inlet passage G152 leading from a gas supply conduit G154. The upper part of the casing encloses a vacuum chamber G156, the lower side of which is formed by the diaphragm G148. The valve formed by the diaphragm G148 is opened against the stop G160 whenever a vacuum is produced in the chamber G146 by suction in the conduit G158 which is connected to the vacuum system of the control apparatus to be described and which corresponds to the conduit 98 of Fig. 1.

The lower portion of the casing G144 is provided with a pilot duct G168 leading from the gas passage G152 to a pilot jet G170 extending near the igniter tube G136 and enclosed within a shield G172 so as to be protected from draft. A tube or chimney G173 is secured to the shield around an opening therein to carry off the products of combustion of the pilot. This tube passes thru a slot in the drawer cover G122 and discharges into a bell G173a supported on the cover. I have found that this arrangement reduces the amount of heat which is transmitted to the generator-absorber from the pilot, and permits the obtaining of lower temperatures during the absorbing period. The shield G172 has an opening G174 through which a match may be inserted to light the pilot and which is normally closed by a cover G176. The shield covers the pilot flame and is heated thereby, being supported so as to be thermally isolated from sources of heat other than the pilot flame, for example by being attached to a bracket G178 of the valve casing G144 through an insulating member G180.

Supported on and thermally connected to the shield is a bimetallic strip G182, the free end of which supports a safety valve G183 cooperating with an opening G184 into the vacuum chamber G146. The valve may be in the form of a tube closed at one end by an integral plate having a smooth ground surface which forms the valve proper, the top having a slot G184a through which the strip G182 passes. Between the bottom of the tube and the bimetallic strip is a spring G185 which urges the valve against a seat G186 on a plug G187 through which the passage G184 opens into the vacuum chamber. The bimetallic strip is so arranged that when the pilot is out the strip is cold and curls to hold the safety valve open to prevent the establishment of a vacuum in the vacuum chamber and thus prevents a supply of gas to the main burner. The strip is so positioned that it can be heated by the pilot flame alone and when the pilot is burning it straightens to close the safety valve and permit the establishment of a vacuum in the valve controlling chamber, opening the gas valve. Thus the gas can never be turned on to the main burner unless the pilot is lighted. The pilot flame may be adjusted by means of a screw valve G188a adjustable through an opening G189 in the front of the drawer G114. The gas pipe G154 leads to any suitable pressure regulating device G190 to which gas is supplied by a conduit G191 which corresponds to the gas supply pipe in Fig. 1.

Secured to the end brackets G76 of the generator-absorber are brackets G192 shown best in Fig. 5 which support the condenser C (described below) above and in front of the generator-absorber. The purpose of supporting the condenser in front of the generator-absorber is to facilitate the connection of a flue to the gas outlet collar G100 and to save space by reducing the over-all height of the apparatus. Preferably the condenser is disposed substantially within the smallest rectangle which can be placed about the generator-absorber and its necessary connections, in order to permit the unit to be installed in a small machine compartment.

When the generator-absorber unit is placed in a cabinet as shown in Fig. 3, I provide a suitable flue or passage for conducting products of combustion out of the machine compartment. The arrangement of the flue is best shown in Figs. 3 and 12 to 14 in which G200 designates an upright passage for gas formed between a channel-shaped sheet metal stack G202 and the sheet metal plate G204 which usually forms the back of a cabinet of this character. The stack G202 is secured to the plate G204 in any suitable manner and extends below its lower end as shown in Fig. 12, that is below the top of the machine compartment. To this upright portion of the flue is connected a slightly inclined transverse portion leading from the generator-absorber, preferably in the form of a removable inverted trough G206, that is a flue open on its bottom. The latter is provided with a lip G208 which may be secured to the back of the cabinet within the flue G200 by means of a screw G210. The lower end of the trough G206 is provided with a pair of feet G212 which rest upon the outer shell G85 of the generator-absorber G and position the trough with its top above the gas outlet collar G100, and a closed end G214 enclosing the collar. The trough G206 forms means for confining the products of combustion within the cross-section of the flue due to the difference in the specific gravity of these products and the surrounding atmosphere. The open bottoms of the trough and the stack G202 serve as means for admitting and mixing air with the products of combustion, tending to prevent condensation of water in the flue. Likewise the open bottom of the trough permits any water which may condense to drop out of the flue and thus prevents its running into the generator-absorber through the outlet collar G100. The trough G206 is loosely attached to the cabinet by the screw G210 so that it may be raised as shown by the dotted lines in Fig. 12 so as not to interfere with removal of the generator-absorber unit from the front of the machine compartment.

The condenser structure C

In Fig. 1, I have shown the vapor condenser 74 and the refrigerant condenser 56 separately in order to simplify the explanation of the refrigerating system. However, in actual practice I prefer to place the two condensers in heat exchange relation with each other and to form them as a single unitary structure. Referring to Figs. 15 and 16 a cylindrical steel drum C10 serves as a container for all of the condensing apparatus, providing a vapor condensing chamber C12 which corresponds to the chamber 74 in Fig. 1. Permanently attached to the side of the drum, as by welding, is a vapor inlet connection C16 corresponding to the vapor conduit 78 of Fig. 1. As shown in Fig. 15 the inlet connection is at a point above the bottom of the drum. One end of the drum is formed by a head C14. This is preferably a forging in which are formed various connections to the condenser, including a liquid drain connection C18 near the bottom of the drum for attachment to the conduit G64a leading to the vapor shell of the generator-absorber and corresponding to the liquid conduit 80 in Fig. 1. On the head C14 are also a pair of bosses C20 and C22 in which are formed an inlet passage C21 and an outlet passage C23, respectively, for a water circulating coil C24. The latter is preferably a copper tube C26 of about 3/8" diameter which is flattened between its ends and coiled edgewise into a helix. One end, C28, of the coil C24 is connected to the passage C21 in the boss C20, and the other end C30 is similarly connected to the passage C23 in the boss C22. The helical coil C24 corresponds to both the coils 62 and 90 in Fig. 1. The coil has its convolutions spaced apart to receive the convolutions of a similar helical coil C34 which is preferably formed of 1/4 inch copper tubing flattened after the manner of the tube C26. The coil C34 is for condensing the refrigerant and corresponds to the chamber 56 of Fig. 1. It is sufficiently flattened to bring the walls close enough together to permit the formation of capillary plugs of liquid which facilitates emptying the coil of liquid refrigerant at the end of the generating period as will be explained later. One end, C36, of the refrigerant coil is attached to a passage C37 in the boss C20 and the other end C42 is attached to a valve C44 preferably welded to the head C14.

The coils C24 and C34 may be readily formed in the inter-threaded relation shown by simultaneously cooling two tubes on a mandrel, flattening and coiling the tubes edgewise as shown in the application of O. M. Summers, Serial No. 146,780 filed November 6, 1926. The tubes are soldered together to form a single unitary structure having the two conduits in intimate thermal relation to each other. After the coils have been attached to the head C14, soldered together as explained, the coils are placed within the drum C10 and the head C14 is welded in place.

The valve C44 includes the cup-shaped body C45 which is provided with an inlet passage C46 surrounded by a valve seat C48. A cup-shaped diaphragm C50 is welded over the mouth of the cup-shaped body C45 and is provided with a spherical projection C51 adapted to be closed on the seat C48. The projection may be forced against the valve seat by a block C52 urged against the diaphragm by a screw C54 threaded in the top C56 which is welded to the cup C44 with the diaphragm. The valve body has a refrigerant outlet C58 which communicates with the conduit G62b leading to the control apparatus as will be explained. The top is provided with a pair of bosses C59 which have threaded apertures to receive bolts for securing the condenser to the supporting brackets G192 on the generator-absorber.

The diaphragm is constructed of a material having a definite but low elasticity and a relatively high plasticity, the elasticity being sufficient to remove the diaphragm from the seat when permitted by the screw C54. That is, the motion of the projection C51 between opening and closing of the valve occurs within the elastic limit. The diaphragm is designed to have high plasticity to permit the construction of the valve without requiring accurate manufacturing and assembling operations, and to allow adjustment of the diaphragm after the valve is assembled. Should the valve be assembled with the diaphragm too far away from the seat, the screw C54 is used to force the diaphragm against the seat, deforming the diaphragm beyond its elastic limit and giving it a new set, after which the diaphragm will be unseated by its own elasticity. Likewise, should the valve be assembled with the diaphragm too close to the seat it may be forced away from the seat and be given a permanent set by any suitable implement inserted through the inlet opening, and thereafter may be seated and unseated within its elastic limit. Soft steel such as is known in the trade as deep drawing steel is a suitable material for the diaphragm. C48 is formed as a thin tube either by cutting a circular groove around the seat in the valve body so as to leave the tube, or by inserting a separate tube and securing it to the valve body in any desired manner. The tube forming the seat is deformable either because of its elasticity or plasticity. Soft steel is also a suitable material for the tube. This deformable seat aids in the manufacture of a valve which closes tightly but which does not require accurate machining or grinding operations in finishing the seat or the valve diaphragm. The spherical projection on the diaphragm is preferably formed in a die, but if this is not perfectly spherical or smooth or if the diaphragm is not accurately centered with respect to the seat, the latter deforms to fit the projection when the latter is urged against it by comparatively slight force.

The end of the shell opposite to the head C14 is formed by a valve C60 which is constructed in the same manner as the valve C44 above described. This valve has an inlet connection C62 within the chamber C12 and an outlet connection C64. The valve is normally closed during operation and is for the purpose of charging the vapor circuit with the heating and cooling fluid, purging air from the heating and cooling system and the like.

The cylinder C10 is covered with insulation such as felt in order to prevent condensation of moisture on its outside surface when cold water is flowing through the condenser. The entire structure including the insulation is encased in an outer shell C68 which is open at its ends and suitably slotted to accommodate the various connections to the drum, and is held in place about the insulation by any suitable means such as a saddle joint fastening in which a tubular clip C70 of C-shaped cross section is slid endwise over the out-turned edges of the casing. Suitable end caps C72 are placed over the ends of the outer casing and are held in place by the brackets.

Preferably the entire outer shell and end caps are covered with a suitable vitreous enamel to provide a protective coating and an attractive finish for the condenser.

The refrigerating element E

The refrigerating element generally designated by E and shown in Fig. 3 is shown in detail in Figs. 19 and 20. The evaporator forming the refrigerating element includes a cylindrical drum or tank E10 forming a receiver for liquid refrigerant the front end of which is formed by a valve E12 which may be welded to the receiver and the construction of which may be the same as that of the valve C44 previously described in connection with the condenser. Preferably, however, a web E14 is formed in the body of the valve in which is formed a passage E16 corresponding to the inlet passage G46 of the condenser valve shown in Fig. 16. Disposed below and at the sides of the receiver are banks of evaporating chambers or ducts E15 formed between suitably corrugated plates E16 welded together along their edges and at suitable intimate intermediate points E18. Preferably the plates E16 are so arranged that the ducts E15 are substantially horizontal and communicate with each other by means of a front header duct E20 and a back header duct E22. A T-shaped liquid refrigerant supply pipe E24 is connected with the bottom of the receiver E10 and leads to the lowermost pair of ducts E15 adjacent the rear header E22, and a pair of refrigerant return conduits E26 lead from the upper pair of transverse ducts E15 at a point adjacent the front header E20 into the upper part of the receiver E10. A sleeve E28 is placed between the inner plates E16 for supporting the trays or drawers E30 for receiving material to be frozen. The sleeve is preferably in intimate thermal contact with the plates. Refrigerant is supplied to and is withdrawn from the refrigerating element by means of the conduit 190 which is connected to the valve E12. The receiver E10 is surrounded by cork insulation E32 which corresponds to the insulation surrounding 66 in Fig. 1.

I prefer to use ammonia as a refrigerant, and to evaporate at a very low temperature, for example 0° Fahrenheit, which will rapidly freeze ice in the containers E30. This temperature is ordinarily too low to maintain satisfactory temperatures throughout a household refrigerating cabinet, ordinarily maintained in the neighborhood of 40° Fahrenheit. Consequently I place the evaporator chambers proper, namely the plates E16, in intimate thermal contact with the freezing chamber E28 but enclose them in a thin coating of some material such as Portland cement which offers a definite resistance to the flow of heat from the cabinet. Preferably the entire refrigerating element is encased in an outer shell or casing E34 into which the Portland cement is poured after placing the evaporator therein. The outer casing then becomes the refrigerating surface for the cabinet and the resistance to heat flow offered by the cement increases its temperature to a suitable value, for example 25° F., which will maintain the desired temperature of 40° F. in the air circulating throughout the cabinet.

The outer surface of the shell may be coated with vitreous enamel to render it smooth and easily cleaned and to present an attractive appearance. The entire structure may be supported to the top wall of the cabinet by bolts passing through the brackets E36 secured to the casing E34. The front of the casing is preferably closed by an enameled plate E38 which may be sealed to the casing by gasket E40 and which is provided with an opening registering with the freezing chamber E28. The gasket preferably has a lip extending in front of the plate E38 around the opening to form a buffer for, and a sealing contact with the tray fronts E46 which are secured to the trays E30 and extend outwardly beyond the opening E42 to form a closure for the freezing chamber. The latter is divided into two compartments for receiving two trays by means of a shelf E48 the front end of which is turned down to close the gap between the two tray fronts E46. The shelf rests on ledges E50 formed in the walls of the chamber E28.

The control structure K

Figure 21:
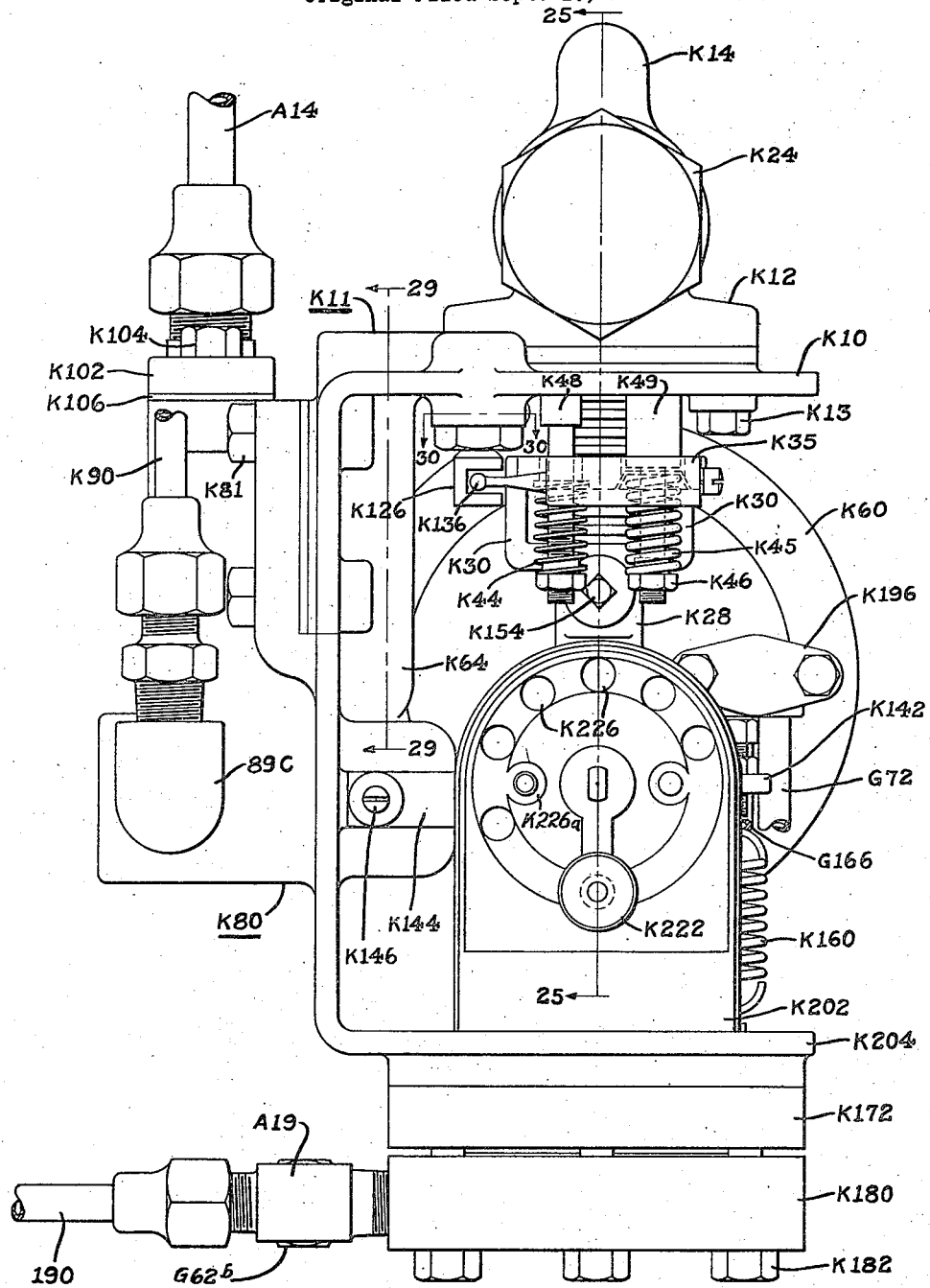
Fig. 21 is a front elevation of the control mechanism, the cover being removed.
Figure 22:
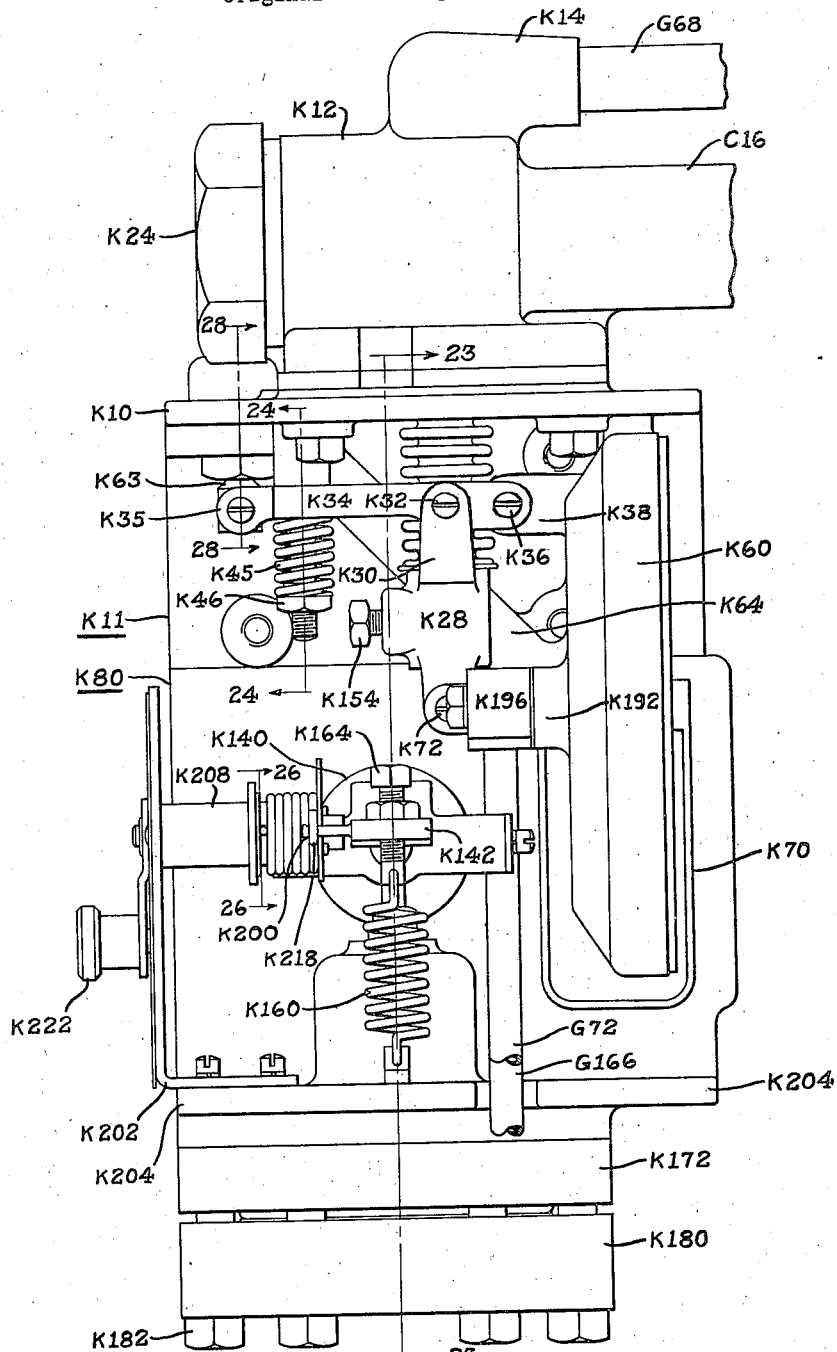
Fig. 22 is a side elevation of the control mechanism.
Figure 28:
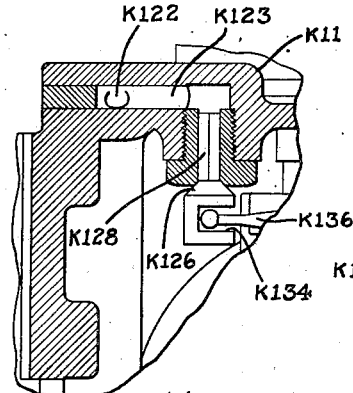
Fig. 28 is a vertical section through the vacuum breaking duct of the control drawn on the line 28—28 of Fig. 22.
Figure 29:
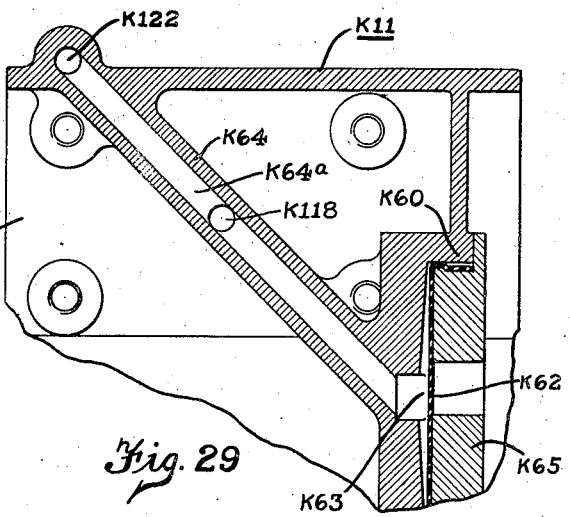
Fig. 29 is a section through a portion of the vacuum duct system drawn on the line 29—29 of Fig. 21.
Figure 30:
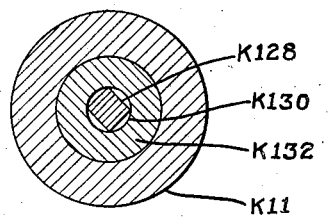
Fig. 30 is an enlarged horizontal section through the vacuum valve drawn on the line 30—30 of Fig. 21.

In Figs. 21 to 31 is shown the preferred form of actual structure of the control apparatus diagrammatically illustrated in Fig. 1. Referring particularly to Figs. 21 to 24, K10 designates a supporting base preferably formed as part of a casting K11. The base is attached to the vapor valve casing K12 by bolts K13. This valve casing corresponds to the valve casing 86 in Fig. 1 and is provided with a vapor inlet connection K14 for attachment to the conduit G68 (Fig. 4) corresponding to 76 in Fig. 1, and a vapor outlet connection C16 preferably in the form of a steel pipe which is welded to the condenser C10. This is the pipe C16 shown in Fig. 15 and forms the support for the base K10 and its associated control mechanism. Referring now to Fig. 25 within the casing K12 is a valve K18 corresponding to the valve 84 in Fig. 1, supported on a stem K20 which is slidable in a bore K22 in a removable plug K24. This valve is adapted to be closed against a seat K26 and to be opened by means of a lever K28 fitted in a slot K29 in the valve, which lever corresponds to the lever 110 in Fig. 1. As shown best in Fig. 23 the lever K28 has two arms K30 extending laterally to form a fork pivoted at K32 to the arms K34 of a second forked lever K35. The arms K34 are in turn pivoted at K36 to stationary lugs K38 forming a part of the casting K11. The lever K35 corresponds to the forked lever 114 in Fig. 1 and as shown in Figs. 21, 22, and 24 is urged upwardly by springs K44 and K45 which are supported between the lever K35 and adjusting nuts K46 threaded on spring bases K48 and K49 which are secured to the platform K10. In the space between the fork arms K30 and K34 is placed a flexible metal bellows K50, the upper end of which is sealed to a tubular extension K52 on the valve housing K12 extending through a suitable opening in the platform K10. The bellows surrounds the lever K28 and is sealed to the latter at its lower end to form a gas tight packing or joint connecting the lever to the valve housing. This bellows also forms a motor responsive to the pressure within the valve housing for depressing the forked lever K35 through the intermediate means of the forked lever K28 against the tension of the springs K44 and K45, and corresponds to the bellows 112 in Fig. 1.

The lever K28 is made in two portions, the portion K28a which extends within the bellows and operates the valve K18 being separate from the forked portion. The latter is provided with a bore K52 into which the portion K28a is inserted and held rigidly by means of a set screw K54. This arrangement is for the purpose of facilitating assembling and dismantling of the apparatus, it being possible to remove the control structure without breaking the vapor circuit by removing the bolts K13 which secure the base plate K10 to the valve housing K12, the portion K28a of the lever K28 remaining with the valve housing and bellows K50.

Figure 31:
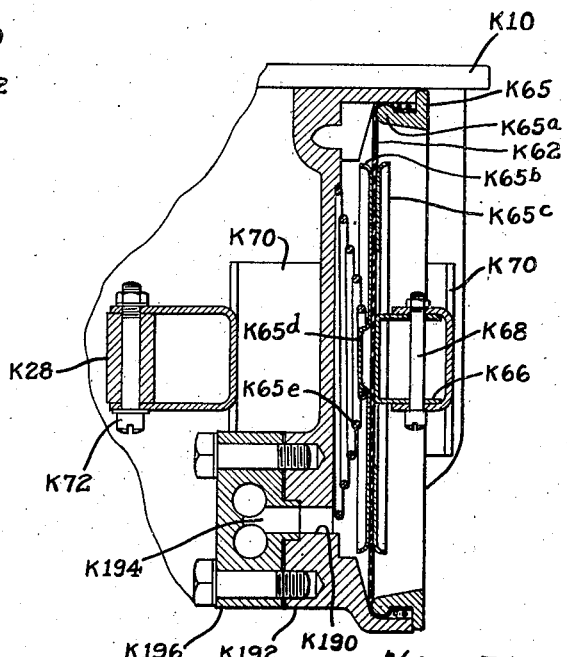
Fig. 31 is a section through the vapor valve operating diaphragm drawn on the line 31—31 of Fig. 25.

As shown in Fig. 25, the casting K11 includes a diaphragm cup K60 which supports a flexible leather or rubber diaphragm K62 which encloses a vacuum chamber K63 and corresponds to the bellows 100 in Fig. 1. The casting K11 is provided with a web K64 in which is formed a duct K64a, best shown in Fig. 29, communicating with the vacuum chamber K63 and forming part of the vacuum conduit system to be described. As shown best in Fig. 31, a diaphragm ring K65 has a protruding shoulder or bead K65a on which the diaphragm K62 is mounted and which, when the diaphragm is mounted thereon, fits into the diaphragm cup with an air tight frictional engagement. The diaphragm may be reenforced by a pair of plates K65b and K65c. The former is provided with a boss K65d around which is placed the uppermost convolution of a conical spring K65e which rests against the bottom of the diaphragm cup for urging the diaphragm outward. The diaphragm plate K65c is provided with a pair of ears K66 in which is a pivot pin K68 for a yoke K70 which passes around the diaphragm cup and is secured at its other end by the pivot pin K72 to the lower end of the lever K28. The diaphragm K62 is moved to the right as seen in Fig. 31 by the spring when atmospheric pressure exists in the vacuum chamber, and when this occurs rotates the vapor valve lever K28 counterclockwise to open the vapor valve K18. When a vacuum is produced in the vacuum chamber by apparatus to be described, the diaphragm K62 is moved to the left as seen in Fig. 31 to close the vapor valve K18. Vertical movement of the lever K28 in response to expansion and contraction of the bellows K50 is permitted by the nature of the yoke K70 and its connections to the diaphragm K62.

As shown best in Fig. 21 a second casting K80 is secured to the casting K11 by bolts K81. As shown in Fig. 23, formed in this casting is a bore K82 registering with a smaller bore K83 which together form a valve chamber. The smaller bore is joined to the larger bore by a conical seat K84. Within the bores is a bushing K85 having a conical bearing face K86 which bears against the seat K84 and prevents communication between the small bore and the large one except through a valve port K87 in the bushing. The bushing also has portion K88 extending within the small bore which in turn is provided with a bore K89 forming a guide for a valve plunger K89a. The bore 89 communicates with a chamber K89b formed in the casting K80 which chamber has an inlet K89c (see Fig. 5) for connection to a water conduit K90 leading from the outlet C22 of the condenser C. The outlet of the valve chamber is the port K87 and this is controlled by the valve plunger K89a which may be closed by an actuator K92 (to be described below) and opened by a spring K93 surrounding a reduced portion of the extension K88 of the bushing K85. This valve corresponds to the valve 144 in Fig. 1 and includes a conical valve face K94 (shown best in Fig. 27) guided by the triangular portion K95 of the plunger in the bore K89 of the bushing K85. The valve controls a jet of water discharging from the port K87 into a vacuum chamber K100 formed in the bushing K85 and corresponding to the chamber 94 of Fig. 1. This chamber is enclosed between the end of an outlet bushing K102 and the end of bore K103 in the bushing K85. The outlet bushing K102 is secured to the casting K80 by bolts K104 (Fig. 21) being sealed to the casting by a gasket 106 and acting to hold the sealing face K86 of the bushing K85 in contact with the seat K84 of the casting. Within the outlet bushing is a Venturi chamber K107 into which the jet of water discharges from the valve opening to produce a vacuum within the vacuum chamber. The throat of the Venturi chamber is approximately the same diameter as that of the directing cylinder K108 which projects through the port K87 from the valve K89a for directing a tubular jet of water into the throat. This arrangement insures maintaining a vacuum seal between the jet and throat when the water flow is low. The vacuum chamber K100 communicates with a vacuum duct K112 in the casting K80 through a passage formed by a reduced portion K114 of the bushing K85 and by openings through the wall of the bushing.

Between the faces of the castings K11 and K80 which are clamped together is placed a soft rubber gasket K116 which is provided with a pimple extending within chamber K116a in the casting K80. The slit K116b is cut in the pimple. This serves as a check valve permitting flow of air in the direction of the jet pump when suction is produced, but preventing flow of water in the reverse direction which might occur when the flow of water is too low to produce suction.

Opposite the chamber K116a the casting K11 has a duct K118 which can communicate through the slit with the vacuum ducts K112. The duct K118 communicates with the duct K64 for producing a vacuum in the latter and in the vacuum chamber K63. The duct K64 communicates with a duct K122 (Figs. 28 and 29) which in turn leads to a duct K123 which may be open to the atmosphere or may be closed by a vacuum breaking valve K126 which corresponds to the valve 124 of Fig. 1 and is operated in response to the condition of the refrigerating system by apparatus about to be described.

The valve K126 is in the form of a cone supported on a non-circular valve guide K128 (Fig. 30) which slides in a bore K130 of a bushing K132 threaded into the casting K11 so as to communicate with the duct K123. A slot K134 is formed in the lower portion of the valve body for receiving the valve operator K136 which latter is in the form of a rod secured in and projecting from the free end of the forked lever K35 and which corresponds to the arm 121 in Fig. 1. This operator is for the purpose of opening the vacuum valve when the forked lever K135 is depressed by the operation of the bellows K50 upon the occurrence of a predetermined high pressure in the vapor circuit and for closing the valve upon the occurrence of a predetermined low pressure in the vapor circuit.

Referring again to Fig. 23, the casting K80 has an opening K140 into the chamber K89b through which passes the water valve actuating arm K92 which is attached to a lever K142 having arms K144 pivoted at K146 to lugs on the casting K80. The operator K92 fits snugly within a bore K148 in the lever K142 and is held securely in place by a set screw K150 to make the arms K92 and K142 in effect a single lever. This arrangement is for the purpose of convenience in assembling. The arm K92 is sealed to the casting K80 by means of the flexible metal bellows K152 which may be soldered at one end to a shoulder of the arm K92 and at the other end to the casting K80. The lever K92–K142 corresponds to the lever 146 in Fig. 1 and is urged in a counter-clockwise direction by the water valve spring K93 which corresponds to the spring 152 in Fig. 1. The water valve lever K92–K142 may be rotated in clockwise direction to close the water valve by a heavy spring K160 which is capable of overcoming the spring K93 when permitted by the thermostat described below. The tension of the spring K160 may be adjusted by the nut K162 on the bolt K164 which passes through the free end of the water valve lever and to which the spring K160 is attached.

In order to prevent closing of the water valve when the refrigeration conditions do not require it, a thermostat is provided including a flexible metal bellows K166 to the closed upper end of which is attached a rod K168 passing loosely through a bushing K170 in the casting K80 so as to bear against the water valve lever. The open end of the bellows is sealed to a plate K172 and communicates through an opening K174 with a pressure chamber K176 formed between a recessed portion in the plate and a flexible steel diaphragm K178. The latter is clamped against and sealed to a shoulder on the plate K172 by a second plate K180 and bolts K182 which latter pass through the plates K172 and K180 into the casting K80, securing all of these together. The pressure chamber K176 and bellows K166 are preferably filled with oil. Beneath the pressure chamber K176 is a second pressure chamber K184 in the plate K180 which communicates with the refrigerant conduit 190 corresponding to the conduit 64 in Fig. 1. This arrangement transmits the pressure of the refrigerant to the underside of the diaphragm K176 which in turn communicates this pressure to the bellows K166. Consequently the position of the rod K168 attached to the bellows is a measure of the temperature of the evaporator. When the evaporator is warm, the bellows is expanded and the rod K168 overcomes the action of the spring K160 to prevent closing of the water valve. This permits refrigeration to take place at the maximum rate. After the evaporator becomes colder the pressure in the refrigerant conduit diminishes and this permits the bellows K166 to contract and the spring K160 may partially close the water valve to restrict the flow of cooling water and reduce the rate of refrigeration. The spring K160 and bellows K166 correspond to the bellows 156 in Fig. 1. The purpose of the diaphragm K176 and the oil filled bellows is to prevent the ammonia from coming in contact with the bellows. Flexible metal bellows such as are readily obtainable on the market are made of material containing copper which may be attacked by ammonia if there is even a slight amount of water present.

As shown best in Fig. 31 the vacuum conduit system of the control includes a duct K190 in a boss K192 on the diaphragm cup K60 which communicates with a twin duct K194 in a fitting K196 secured to the boss K192. The conduit G166 which operates the gas burner is attached to the fitting and the high temperature safety conduit G72 is also attached to the fitting. This arrangement permits the establishment of the necessary vacuum in the gas valve chamber and destroys the vacuum in the entire control system if the fusible plug G74 of the high temperature safety should melt.

*The temperature adjustment*

In order that the temperature of the cabinet at which the water valve partially closes may be easily regulated by the user of the apparatus to adjust the temperature of the refrigerator cabinet without interfering with the normal adjustment thereof, I provide an auxiliary control which operates on the water valve lever. Attached to the water valve lever K142 is an integral stud K200 best shown in Fig. 22. A bracket K202 is attached to the horizontal base K204 of the casting K80 and, as shown in Fig. 25, carries a shaft K206 journaled in a sleeve K208 secured to the bracket, the shaft having a slot K210 in its free end and having an arm K212 keyed to its other end. Surrounding the shaft is a helical spring K214 the end K216 of which is inserted in the slot and the other end of which is formed into a hook K218 which may engage the arm K200 as shown best in Fig. 26. Rotation of the shaft K206 in a counter-clockwise direction causes the hook to engage the arm K200 and wind up spring K214 to add its tension to that of the water valve spring K93 in urging the water valve lever counter-clockwise to permit the valve to open. This in effect reduces the tension of the spring K160 and thus requires a lower cabinet temperature to close the water valve a given amount than when the spring K214 does not engage the valve lever. The amount of tension which is supplied to the spring K214 is determined by the amount of rotation of the shaft K206 and this determines the amount which the temperature of the cabinet is reduced below normal. The arm K212 can be held in any desired position to maintain any desired cabinet temperature by means of the plunger K220 connected to the knob K222 by which the arm is rotated and urged by a spring K224 through any desired opening K226 in the bracket K202. The stop member K226a limits the movement of the knob K222 to one complete revolution so that it is impossible to move the knob K222 above or below the selected positions. The shaft K206 may be rotated clockwise by means of the arm K212 so that the cold control spring K214 is entirely out of contact with the stud K200, which condition permits the apparatus to function in response to its normal adjustments. The shaft K206 also carries an arm K228 keyed thereto by having a portion inserted in the slot K210 which arm upon further clockwise rotation forces the stud K200 down to positively close the water valve and prevent operation of the apparatus.

Assembly of the condensing unit

As shown in Figs. 3 to 5 the condenser C is supported between the brackets G192 of the generator-absorber unit G and the control structure K is supported by the vapor connection C16. The generator, condenser, control and connections form a complete condensing unit which is supported on the base formed by the end brackets G16 of the generator-absorber. This unit may be placed wherever desired, for example in the machine compartment 188 of a refrigerating cabinet as shown in Fig. 3.

Figure 32:
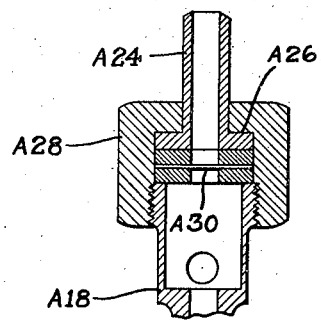
Fig. 32 is an enlarged vertical section of a portion of the high pressure safety release fitting shown in Figs. 4 and 5.

The connections between the various elements of the condenser unit are best shown in Figs. 4 and 5. A water inlet connection A12 is provided for attachment to the inlet bushing C20 of the condenser, the water passing through the condenser, thence by the conduit K90 to the inlet K80c of the water valve, thence through the valve chamber and jet pump leaving the control by the conduit A14 having a connection A16 for attachment to the sewer. The vapor condensing chamber C12 of the condenser drains to the vapor shell of the generator-absorber through the conduit G64a corresponding to the conduit 80 in Fig. 1, and receives vapor from the vapor shell by the conduits G68 and C16 corresponding to 76 and 78 respectively in Fig. 1. The refrigerant leaves the generator-absorber shell through the conduit G62 which is connected through a fitting A18 to the conduit G62a which leads to the inlet of the ammonia condensing coil C34 of the condenser, the refrigerant leaving the condensing coil by the conduit G62b which is connected through the fitting A19 with the pressure chamber K184 of the control apparatus and with the conduit 190 which leads to the refrigerating element. The fitting A18 which connects conduits G62 and G62a, as shown best in Figs. 5 and 32, is connected to the sewer connection A16 by a pipe A24 having a shoulder A26 by which it is clamped to the fitting by a nut A28. Communication between the interior of the fitting A18 and the pipe A24 is normally prevented by a rupture disk A30 clamped between a pair of gaskets interposed between the shoulder A26 and the end of the fitting A18. The rupture disk is a safety device which breaks upon the occurrence of a dangerously high pressure within the refrigerant circuit and permits the discharge of the refrigerant to the sewer.

Operation of the structure

I may charge the generator-absorber with a mixture of strontium chloride containing 4 to 10 percent of lithium nitrate as this material has been found to form a packed mass in the generator-absorber which is stable under evolution and absorption of ammonia and does not shrink and settle upon evolution or subsequently expand upon absorption. The avoidance of the shrinking and subsequent expansion of the material prevents setting up destructive mechanical forces within the generator-absorber. The mixture of strontium chloride and lithium nitrate forms addition-compounds of various orders with ammonia, in the manner explained in connection with calcium chloride, and for the purposes of this application, the mixture may be considered to operate in the same manner as regards its evolution and absorption characteristics.

The vapor heating and cooling circuit is preferably charged with a volatile fluid such as ethyl chloride whose vapor pressure characteristics are such as to correspond with the vapor pressure characteristics of the absorbent used so as to maintain a pressure outside of the generator-absorber shell which balances the pressure of the ammonia within the shell and thus eliminates strain on the shell.

When the apparatus is started the absorbent in the generator-absorber is saturated with ammonia and a quantity of liquid ammonia is in the evaporator. To start the apparatus the pilot G170 is first lighted and the water turned on in the condensing circuit. The vacuum valve K126 is closed because the bellows K50 is contracted due to low pressure in the ethyl chloride circuit. When the pilot has heated the thermostat G182 sufficiently to close the safety vacuum valve G183 of the burner control valve shown in Fig. 11, then if the flow of water is sufficient for condensing purposes the pressure in the gas valve vacuum chamber G158 will be reduced through the conduit G166, fitting K194 (Fig. 31), vacuum chamber K63, ducts K64a, K118, chamber K116a and duct K112 and the gas valve will be opened to ignite the burner G102. Simultaneously the reduced pressure produced by the jet pump will move the diaphragm K62 to the left as seen in Fig. 31 to close the vapor valve K18 and prevent the circulation of ethyl chloride in the vapor circuit. Evaporation of the ethyl chloride then drives the greater portion of the liquid ethyl chloride up into the condensing chamber Cl2 (Fig. 16) leaving sufficient liquid in the vapor shell G53 Fig. 6 to be vaporized and condensed on the generator shell G10. The liquid ethyl chloride in the condenser is reduced to and maintained at the temperature of the cooling water.

Figure 33:
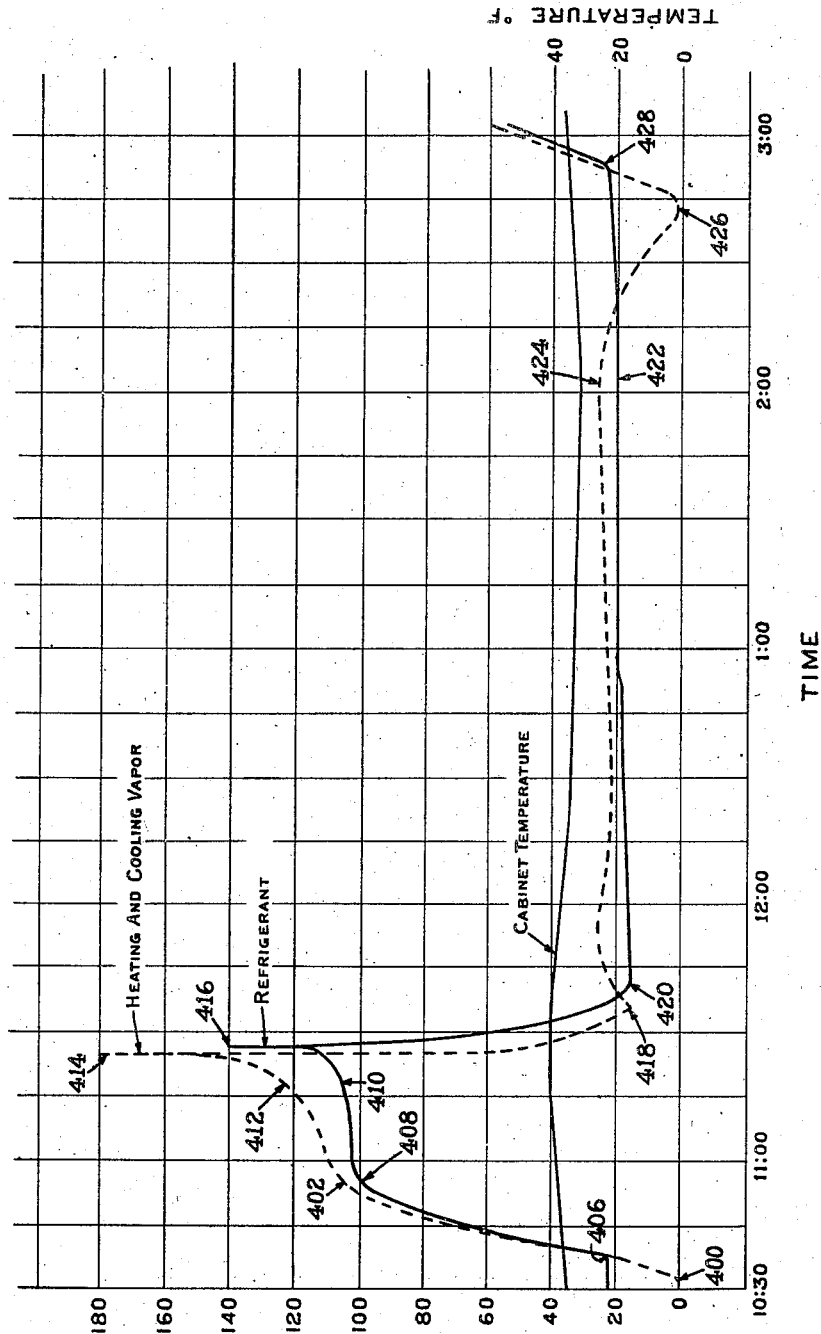
Fig. 33 is a set of curves showing operating conditions of the apparatus.

Fig. 33 shows the pressure conditions of the system plotted against time for a cycle of operations. In this figure the abscissas represent time and the ordinates represent pounds per square inch gauge pressure for all curves except cabinet temperature with the relation to which ordinates represent temperatures in degrees Fahrenheit. When the heating of the ethyl chloride begins the pressure rapidly rises as indicated by the portion 400—402 of the vapor curve. The absorbent is rapidly heated with the ethyl chloride and distills ammonia at a pressure which follows closely the pressure of the ethyl chloride as shown by the portion 406—408 of the refrigerant curve. At the point represented by 408 the absorbent begins to evolve ammonia which is changed in phase state from the solid phase of a compound with strontium chloride to the gaseous phase of the free ammonia, which is condensed in the coil C34 of Fig. 16 at a constant rate by the cooling water. The condenser maintains a substantially constant pressure in the ammonia circuit, and the absorption by the strontium chloride from the ethyl chloride of the latent heat of evolution of the ammonia tends to maintain a substantial constant pressure of the ethyl chloride as shown by the portion 402—412 of the vapor curve. At the point represented by 410 on the refrigerant curve substantially all of the strontium chloride has been converted from a high ammine to a low ammine, consequently evolution of ammonia and the absorption of latent heat from the ethyl chloride ceases. This causes the temperature and pressure of the ethyl chloride suddenly to rise as indicated by the portion 412—414 of the vapor curve to a value of about 180 pounds per square inch.

The springs K44 and K45 of Fig. 21 are set to a combined tension corresponding to a pressure of 180 pounds in the vapor circuit. When this pressure is attained the lever K35 has been depressed by the packing bellows K50 to such an extent that the arm K136 pushes open the vacuum valve K128 breaking the vacuum in the control system. When the vacuum valve has opened it drops until the upper side of the slot K134 rests on the arm K136 so that the arm will not immediately close the vacuum valve upon a slight contraction of the bellows K50 but will have to move a considerable distance upward, representing an appreciable contraction of the bellows before the vacuum valve can be closed. When the vacuum valve is open the gas valve diaphragm K148 immediately closes shutting off the burner, and the vapor valve operating diaphragm K62 is moved to the right as seen in Fig. 31 by the spring K65c to open the vapor valve K18. At this moment the condensing coil C34 is filled with the last increment of liquefied ammonia which has been evolved from the strontium chloride and when the vapor valve K18 is opened the liquid ethyl chloride runs down into the vapor shell and the hot ethyl chloride vapor at a pressure of 180 pounds rises into the vapor chamber Cl2 of the condenser. This hot ethyl chloride vapor heats the ammonia in the coil C34 sufficiently to vaporize a small portion of the liquid and raise the pressure as shown by the portion 410—416 of the refrigerant curve to a value of approximately 140 lbs. This is sufficiently above the existing condensing pressure of about 105 lbs. (which is the pressure in the evaporator) to force the remaining refrigerant up into the evaporator. The coil will be emptied of liquid due to the fact that the liquid will form capillary plugs in the coil and in conduit 196 (which connects the condenser to the evaporator) ahead of the vaporized ammonia, the size of the coil and conduit being selected for this purpose.

When the hot vapor passes through the condensing chamber Cl2 it is condensed by contact with the cold water coil C24 so as to rapidly reduce the pressure of the ethyl chloride as shown by the portion 414—418 of the vapor curve. Likewise the sudden immersion of the generator-absorber shell in cold liquid ethyl chloride causes a sudden reduction in the pressure of the ammonia as is shown by the portion 416—420 of the refrigerant curve. At the low pressure corresponding to the temperature to which the absorber is now cooled, the ammonia in the refrigerating element evaporates and the strontium chloride mixture absorbs the ammonia with avidity. In being absorbed the ammonia changes its phase state from ammonia vapor to the solid phase of an ammine of strontium chloride and so doing gives up latent heat which vaporizes the ethyl chloride in the vapor circuit, the vapor circulating and condensing, as explained, to transfer to the cooling water the latent heat of absorption. This transfer tends to maintain a substantially constant refrigerant pressure as indicated by the portion 420—422 of the ammonia curve and consequently a substantially constant pressure of the ethyl chloride as indicated by the portion 418—424 of the vapor curve. This absorption of ammonia produces refrigeration in the evaporator in the well known manner. Any tendency of the generator-absorber to absorb ammonia faster than is required to maintain the cabinet at the desired temperature (which would be produced by too fast a flow or too low a temperature of cooling water) will be compensated by reducing the flow of cooling water through the bellows K166 acting on the water valve K89a. As the temperature of the environment of the evaporator tends to be reduced below the desired point the bellows collapses to withdraw the rod K168 and permits the spring K160 to close the water valve against the action of the spring K93 and thus reduce the flow of cooling water to the rate required to maintain the rate of absorption corresponding to the refrigerating requirements.

As the pressure of the ethyl chloride is reduced the springs K44 and K45 collapse the bellows K50 and move the lever K35 carrying the vacuum valve actuator K136 upward. The spring support K49 is arranged to stop the expansion of the spring K45 before the vacuum valve can be closed, that is when the pressure of the ethyl chloride is at some point above the horizontal portion 418—424 of the vapor curve. This removes the influence of heavy spring K45 from the lever K35 and renders the lever thereafter sensitive to small changes in pressure, under the influence only of the relatively light spring K44. After the absorbent has all been reconverted into the higher ammine, the absorption of ammonia ceases and latent heat is no longer given up by the vapor shell. This causes the temperature of the ethyl chloride to drop gradually to that of the cooling water, resulting in a pressure drop corresponding to the portion 424—426 of the vapor curve. In the apparatus under consideration the ammonia pressure remains substantially constant during this period as shown by the portion 422—428 of the ammonia curve due to the fact that a considerable quantity of liquid ammonia remains in the refrigerating element to maintain the lower portion of the evaporator flooded as has been explained. Another advantage resulting from this excess quantity of ammonia is that a large area of ammonia is always exposed to be able to absorb heat from the cabinet and the last increment of ammonia which can be absorbed by the absorber can be evaporated substantially as rapidly as the first increment absorbed. This reduces the temperature differential between the cabinet and absorber which is required to evaporate the last increment of ammonia, in other words keeps the cabinet cold throughout the entire evaporating period.

When the pressure of the ethyl chloride drops to the point indicated by 426 on the vapor curve this is an indication that the absorbent is completely saturated. The tension of the spring K44 is so adjusted that the vacuum valve is closed at this pressure to initiate a new heating period. The points 426 and 428 of the vapor and refrigerant curves correspond to the points 400 and 406 respectively and indicate the beginning of a new generating period.

If it is desired to maintain a lower cabinet temperature the arm K212 of the cold control is turned to the right to supply spring tension to the water valve lever in the direction tending to open the valve. This requires a lower cabinet temperature before the valve can be closed to reduce the rate of refrigeration.

If the generator-absorber should become overheated for any reason, for example due to accident resulting in leakage of ethyl chloride from the vapor circuit, the fusible plug G74 will melt before the temperature reaches a dangerous point. This will break the vacuum and immediately shut off the burner to prevent further heating. It will be noted that heating of the apparatus depends entirely upon existence of the vacuum which in turn depends upon a certain rate of flow of cooling water. Therefore if the water supply fails the vacuum cannot be maintained. But even were adequate water available and the condenser tube should become clogged so as to prevent flow of cooling water, the vacuum cannot be maintained and the apparatus cannot operate. Breakage, leakage or failure of any part of the control circuit will break the vacuum and prevent heating of the apparatus. In the event of abnormal pressure generated in the refrigerant circuit which might be caused, for example by exposure of the apparatus to a fire, the disc A30 will be broken and permit the discharge of the confined refrigerant to the sewer before a dangerous pressure can be attained.

Figure 34:
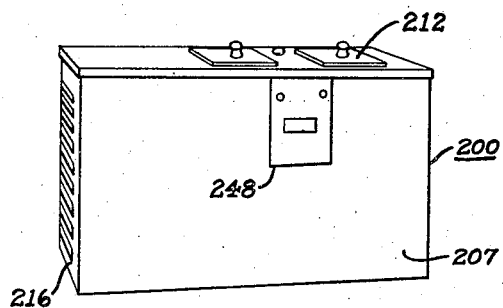
Fig. 34 is a perspective view of a modified form of refrigerating cabinet.
Figure 35:
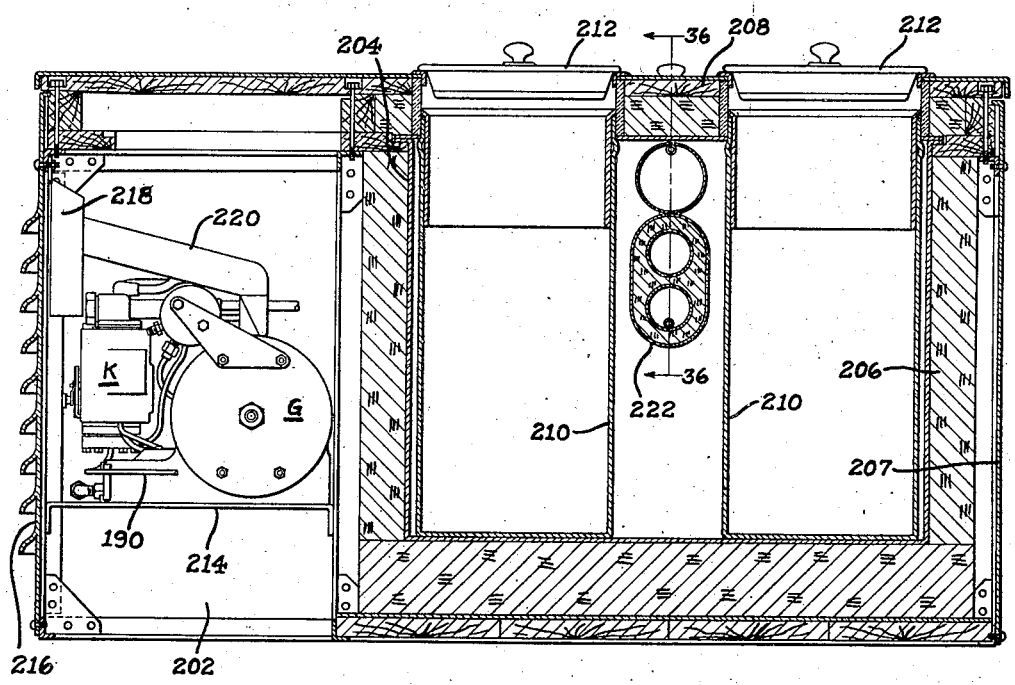
Fig. 35 is a vertical longitudinal section through the cabinet shown in Fig. 34, showing a portion of the refrigerating apparatus in elevation.
Figure 39:
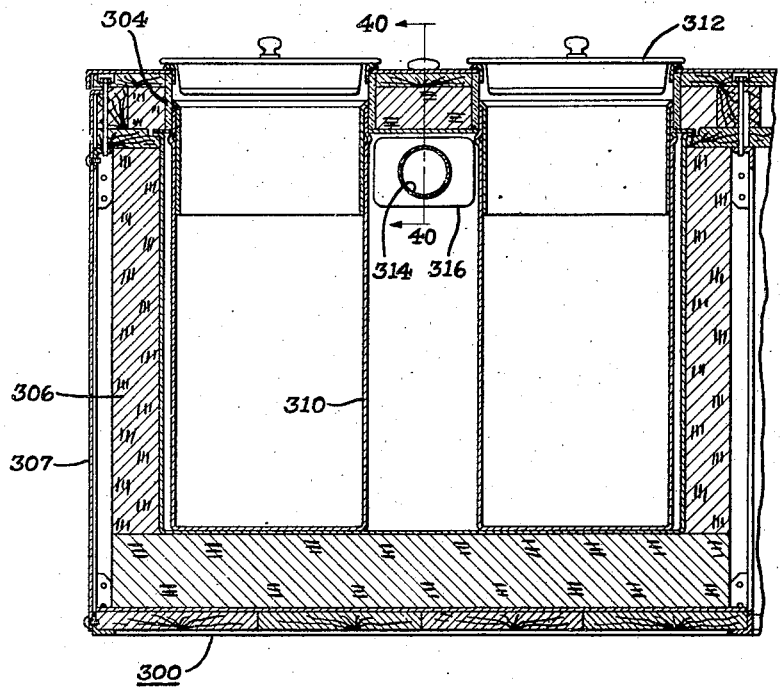
Fig. 39 is a vertical longitudinal section through a portion of the cabinet.
Figure 38:
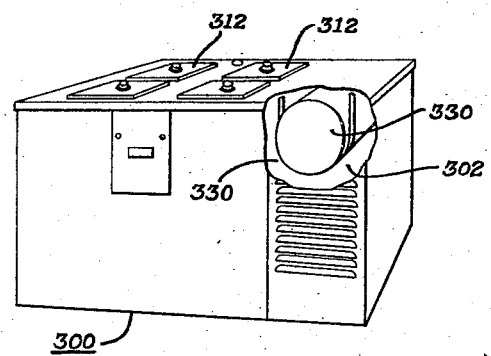
Fig. 38 is a perspective view of another form of refrigerating cabinet.
Figure 40:
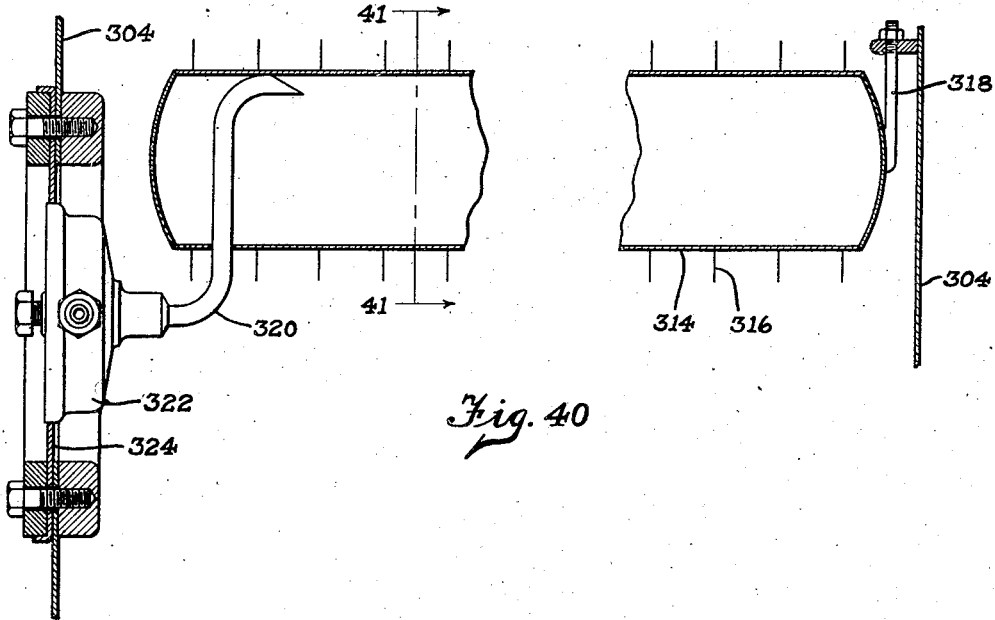
Fig. 40 is a vertical longitudinal section of the refrigerating element shown in Fig. 39 drawn to an enlarged scale along the line 40—40 of Fig. 39.
Figure 41:
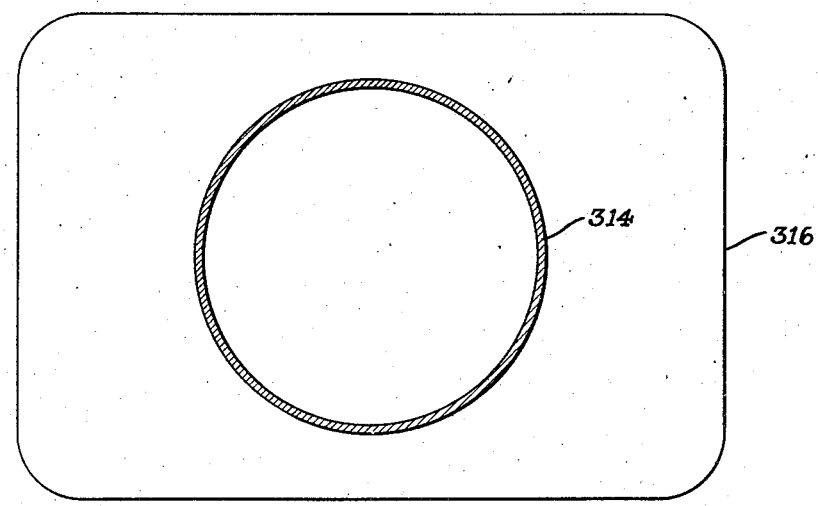
Fig. 41 is a section on the line 41—41 of Fig. 40.

Figs. 34 to 37 show a modified form of refrigerating apparatus especially adapted to keep ice cream. Referring particularly to Figs. 34 and 35, 200 designates an ice cream cabinet having a machine compartment 202 and a refrigerating compartment in the form of a brine tank 204 which is enclosed by insulating walls 206 (covered with panels 207) and by an insulating top 208. Within the brine tank are disposed upright compartments or sleeves 210 for receiving ice cream cans access to which may be had through openings in the top 208 closed by insulating covers 212. In the machine compartment is a base 214 which supports the condensing element previously described. The machine compartment is closed by a removable louvered panel 216 adjacent to which is provided a gas outlet box 218 into which the flue 220 discharges the products of combustion from the burner. The entire condensing unit may be removed for inspection and replacement by removing the panel 216 and sliding the condensing unit to the left as shown in Fig. 35 on the base 214.

The refrigerating element 222 is placed between compartments 210 and immersed in the brine in the usual manner. The construction of the refrigerating element shown in Figs. 36 and 37 in which 204 is the wall of the brine tank previously referred to. The wall has an opening 224 which may be closed by a cover plate 226 which is secured liquid-tight over the opening by a pair of clamping rings 228 and 230 and bolts 232. The plate supports the refrigerating element 222 which includes a receiver 234 surrounded by insulation 236 which insulation is encased in a container 238. This receiver corresponds to the receiver 66a in Fig. 1 and is provided with a valve 240 the construction of which may be identical with that of the condenser valve C44 shown in Fig. 16. The valve has a connection 242 to which the refrigerant conduit 190 is connected for supplying refrigerant to and withdrawing refrigerant from the receiver. Disposed above the receiver is an evaporator 244 the top of which is connected to the bottom of the receiver by the pipe 246. Preferably the evaporator is soldered to the casing 238 which encloses the insulation in order to form a support for the evaporator and an extended cooling surface, the shell 238 acting as a heat conducting fin. The evaporator 244 is placed at the top of the brine so that convection currents will be set up in the brine and the entire column of the brine thus effectively cooled.

The refrigerating element may be removed as a unit from the brine tank by removing the supporting plate 226. For this purpose the front insulating wall is provided with an opening and the panel 207 covering the insulation is provided with a removable cover plate 248. When the insulating element is in place the opening in the insulated front wall behind the cover plate 248 is filled with removable insulation such as kapok, granulated cork or the like in order to protect the otherwise exposed parts of the receiver 234 which project in front of the plate 226.

Figs. 38 to 41 show a somewhat modified construction of an ice cream cabinet and refrigerating element. In this arrangement the cabinet 300 includes the machine compartment 302 and the brine tank 304 encased in the insulating walls 306 covered by panels 307, the brine tank having two pairs of compartments 310 closed by covers 312 spaced apart to receive the refrigerating element. The latter includes an evaporator consisting of a cylindrical tank 314 provided with fins 316 and supported by the hanger 318 on the back wall of the brine tank and by the pipe 320 which connects the top of the container with the valve 322 supported in the cover plate 324 which latter is similar to the cover plate 226 in Fig. 36 and similarly bolted to the brine tank. The valve 322 is in all respects similar to valve 240 of Fig. 36 and may be welded to the cover plate 324.

In this modification the receiver 330 corresponding to the receiver 66a in Fig. 1 is placed in the machine compartment above the condensing unit and is connected by a suitable conduit with the valve 322.

While the form of embodiment of the invention as herein disclosed, constitutes a preferred form, it is to be understood that other forms might be adopted, all coming within the scope of the claims which follow.

What is claimed is as follows:

1. In an intermittent absorption refrigerating system, a generator-absorber to be alternately heated and cooled, a vaporizing chamber in heat exchange relation with the generator-absorber, a closed circuit communicating with said vaporizing chamber and disposed above its level, volatile fluid for heating and cooling the generator-absorber in said circuit, means for vaporizing liquid in the chamber to heat the generator-absorber and means for preventing circulation of fluid in said circuit when the vaporizing means is operating, the quantity of liquid in said circuit being so proportioned that the initial vaporization of liquid by said vaporizing means forces a substantial proportion of the remaining liquid out of said chamber.

2. In an intermittent absorption refrigerating system, a generator-absorber to be alternately heated and cooled, a closed circuit in heat exchange relation with the generator-absorber and containing fluid for heating and cooling the generator-absorber, and means responsive to the temperature of the generator-absorber for controlling the circulation of the fluid through the circuit.

3. Refrigerating apparatus comprising in combination a generator-absorber to be alternately heated and cooled, latent heat removing means to be cooled, a conduit for constantly circulating cooling medium, means for controlling the operation of the system, means responsive to the flow of cooling medium in the conduit tending constantly to operate the controlling means and means responsive to the condition of the system for preventing the operation of the controlling means.

4. In refrigerating apparatus in combination, a condensing conduit adapted to be periodically supplied with vapor to be liquefied therein, the cross-section of the conduit being such as to form capillary plugs of the liquid condensed, and means for heating the conduit at the end of a condensing period to empty the conduit of liquid.

5. Refrigerating apparatus comprising means for circulating refrigerant, a control device, means tending constantly to produce a vacuum in the control device, and vacuum responsive means for controlling the operation of the circulating means.

6. The method of heating and cooling a generator-absorber which consists in alternately condensing a volatile fluid and dissipating the heat of condensation to the generator-absorber and evaporating the volatile fluid to withdraw heat from the generator-absorber and condensing the vaporized fluid remote from the generator-absorber.

7. Refrigerating apparatus including a generator-absorber, means for heating and cooling said generator-absorber including a closed circuit containing a volatile fluid in heat exchange relation with the generator-absorber, means to heat the fluid and means to cool the fluid, and means responsive to the temperature of the fluid within said circuit for controlling the heating means.

8. Refrigerating apparatus including a generator-absorber, means for heating and cooling said generator-absorber comprising a closed circuit containing a volatile fluid in heat exchange relation with the generator-absorber, means to heat the fluid and means to cool the fluid, and means responsive to the temperature of the fluid within said circuit for controlling the cooling of the generator-absorber.

9. Refrigerating apparatus including a generator-absorber, means for heating and cooling said generator-absorber including a closed circuit containing a volatile fluid in heat exchange relation with the generator-absorber, means to heat the fluid and means to cool the fluid, and means responsive to the temperature of the fluid within said circuit for controlling the heating and cooling of the generator-absorber.

10. Refrigerating apparatus including a generator-absorber, means for heating and cooling said generator-absorber including a closed circuit containing a volatile fluid in heat exchange relation with the generator-absorber, means to heat the fluid and means to cool the fluid, and means responsive to the pressure of the fluid within said circuit for controlling the heating means.

11. Refrigerating apparatus including a generator-absorber, means for heating and cooling said generator-absorber comprising a closed circuit containing a volatile fluid in heat exchange relation with the generator-absorber, means to heat the fluid and means to cool the fluid, and means responsive to the pressure of the fluid within said circuit for controlling the cooling of the generator-absorber.

12. Refrigerating apparatus including a generator-absorber, means for heating and cooling said generator-absorber including a closed circuit containing a volatile fluid in heat exchange relation with the generator-absorber, means to heat the fluid and means to cool the fluid, and means responsive to the pressure of the fluid within said circuit for controlling the heating and cooling of the generator-absorber.

13. Refrigerating apparatus including a generator-absorber, means to heat and cool said generator-absorber including a closed circuit for circulating a heating and cooling liquid in heat exchange relation with said generator-absorber, means to heat said liquid and means to cool said liquid, and means responsive to the pressure of the liquid for starting the circulation of said liquid.

14. Refrigerating apparatus including a generator-absorber, means for heating and cooling said generator-absorber, comprising a closed circuit containing a volatile liquid in heat exchange relation with said generator-absorber, means to heat the liquid and means to cool the liquid and automatic means for controlling said heating means.

15. Refrigerating apparatus including a generator-absorber, means for heating and cooling said generator-absorber, comprising a closed circuit containing a volatile liquid in heat exchange relation with said generator-absorber, means to heat the liquid and means to cool the liquid and automatic means for controlling said cooling of the generator-absorber.

16. Refrigerating apparatus including a generator-absorber, means for heating and cooling said generator-absorber, comprising a closed circuit containing a volatile liquid in heat exchange relation with said generator-absorber, means to heat the liquid and means to cool the liquid and automatic means for controlling said heating and cooling of the generator-absorber.

17. Refrigerating apparatus including a generator-absorber, a condenser and an evaporator, means for cooling said generator-absorber, adjustable means for controlling the rate of cooling of said generator-absorber, said last named means operating in response to conditions of said evaporator, and manually operated means movable to a plurality of selective positions for varying the effectiveness of said controlling means without disturbing its adjustment to obtain temporarily a different temperature in said evaporator.

18. Refrigerating apparatus including an evaporator and an absorber, means for cooling said absorber, means responsive to conditions of said evaporator for controlling said cooling means, and manually operated means for varying the effectiveness of said controlling means without disturbing its adjustment to obtain temporarily a different temperature in said evaporator, said manually operated means being movable to a plurality of selective positions.

19. Refrigerating apparatus comprising a generator-absorber, a condenser and an evaporator, means for heating and cooling said generator-absorber comprising a closed circuit in heat exchange relation with said generator-absorber and containing a volatile liquid, means for cooling said circuit and means for heating said circuit.

20. That step in the art of refrigeration which comprises alternately vaporizing and condensing a volatile liquid in heat exchange relation with a generator-absorber to thereby alternately heat and cool said generator-absorber.

21. Refrigerating apparatus including a generator-absorber, means for heating and cooling said generator-absorber including a closed circuit containing a volatile fluid in heat exchange relation with the generator-absorber, means to heat the fluid and means to cool the fluid, and means responsive to the temperature of the generator-absorber for controlling the heating means.

22. Refrigerating apparatus including a generator absorber, means for heating and cooling said generator-absorber including a closed circuit containing a volatile fluid in heat exchange relation which said generator-absorber, means to heat the fluid and means to cool the fluid and means responsive to the temperature of said generator-absorber for controlling the cooling of said generator-absorber.

23. Refrigerating apparatus including a generator-absorber, means to heat and cool said generator-absorber including a closed circuit for circulating a heating and cooling liquid in heat exchange relation with said generator-absorber, means to heat said liquid and means to cool said liquid, and means responsive to the pressure of the liquid for controlling the circulation of said liquid.

24. Refrigerating apparatus including a generator-absorber, means to heat and cool said generator-absorber including a closed circuit for circulating a heating and cooling liquid in heat exchange relation with said generator-absorber, means to heat said liquid and means to cool said liquid, and means responsive to the temperature of the liquid for controlling the circulation of said liquid.

25. Refrigerating apparatus including a generator-absorber, means to heat and cool said generator-absorber comprising a closed circuit for circulating a volatile liquid in heat exchange relation with said generator-absorber, means to heat said liquid, means to cool said liquid, and automatic means for controlling the circulation of said liquid.

26. Refrigerating apparatus including a generator-absorber, a condenser and an evaporator, means for cooling said generator-absorber, adjustable means for controlling the temperature of said evaporator, and manually operated means movable to a plurality of selective positions for varying the effectiveness of said controlling means without disturbing its adjustment to obtain temporarily a different temperature in said evaporator.

27. Refrigerating apparatus including an evaporator and an absorber, means for cooling said absorber to cause an absorption of refrigerant vapors resulting from evaporation of refrigerant in said evaporator, adjustable means for controlling rate of evaporation of refrigerant in the evaporator, and manually operable means including a handle movable to a plurality of selective positions for varying the said controlling means to thereby obtain a different temperature in said evaporator, and means limiting the movement of the handle to prevent the adjustment of said control means either above or below said selective positions.

28. Refrigerating apparatus including means to generate a refrigerant from and to absorb a volatile refrigerant in an absorbent, means for heating said absorbent during the generation period and cooling said absorbent during the absorption period comprising a closed circuit for circulating a second volatile liquid in heat exchange relation with the absorbent, means to heat said second liquid, and means to cool said second liquid, and automatic means to control the circulation of the liquid.

HARRY F. SMITH.